United States Patent
Yoda et al.

(10) Patent No.: US 7,236,222 B2
(45) Date of Patent: Jun. 26, 2007

(54) LIQUID CRYSTAL PANEL AND LIQUID CRYSTAL DISPLAY APPARATUS

(75) Inventors: Kenji Yoda, Osaka (JP); Shuuji Yano, Osaka (JP); Masaki Hayashi, Osaka (JP)

(73) Assignee: Nitto Denko Corporation, Osaka (JP)

( * ) Notice: Subject to any disclaimer, the term of this patent is extended or adjusted under 35 U.S.C. 154(b) by 89 days.

(21) Appl. No.: 11/280,534

(22) Filed: Nov. 17, 2005

(65) Prior Publication Data

US 2006/0132688 A1 Jun. 22, 2006

(30) Foreign Application Priority Data

Dec. 20, 2004 (JP) ............................. 2004-367040
Jun. 29, 2005 (JP) ............................. 2005-190515

(51) Int. Cl.
G02F 1/1335 (2006.01)
(52) U.S. Cl. ...................................... 349/120; 349/118
(58) Field of Classification Search ......... 349/118–120
See application file for complete search history.

(56) References Cited

U.S. PATENT DOCUMENTS

| 5,245,456 | A | 9/1993 | Yoshimi et al. | |
|---|---|---|---|---|
| 6,285,430 | B1 | 9/2001 | Saito | |
| 6,292,242 | B1* | 9/2001 | VanderPloeg et al. | 349/118 |
| 6,587,171 | B1* | 7/2003 | Georges et al. | 349/120 |
| 7,088,411 | B2* | 8/2006 | Allen et al. | 349/121 |
| 2003/0210370 | A1 | 11/2003 | Yano et al. | |
| 2003/0231270 | A1* | 12/2003 | Kume et al. | 349/119 |
| 2005/0062917 | A1 | 3/2005 | Kashima | |
| 2005/0200792 | A1* | 9/2005 | Jeon et al. | 349/141 |

FOREIGN PATENT DOCUMENTS

| JP | 4-305602 | 10/1992 |
|---|---|---|
| JP | 5-157911 | 6/1993 |
| JP | 11-305217 | 11/1999 |
| JP | 2001-215332 | 8/2001 |
| JP | 2004-004641 A | 1/2004 |
| JP | 2004-157523 | 6/2004 |
| JP | 2004-272202 A | 9/2004 |
| JP | 2004-326089 A | 11/2004 |

* cited by examiner

*Primary Examiner*—James A. Dudek
(74) *Attorney, Agent, or Firm*—Westerman, Hattori, Daniels, & Adrian, LLP.

(57) ABSTRACT

There is provided a liquid crystal panel having an improved contrast ratio in an oblique direction and an improved color shift in an oblique direction. Further, there is provided a liquid crystal panel with excellent display uniformity. The liquid crystal panel of the present invention includes: a liquid crystal cell; a first polarizer arranged on one side of the liquid crystal cell; a second polarizer arranged on the other side of the liquid crystal cell; a first optical element and a second optical element arranged between the first polarizer and the liquid crystal cell; and a third optical element arranged between the second polarizer and the liquid crystal cell, in which: the first optical element has substantially optically negative uniaxial property; the second optical element satisfies the following expressions (1) and (2) and is arranged between the first optical element and the liquid crystal cell; and the third optical element has substantially optical isotropy.

$$130 \text{ nm} \leq Re[590] \leq 250 \text{ nm} \quad (1)$$

$$0 \text{ nm} < Rth[590] < Re[590]. \quad (2)$$

14 Claims, 11 Drawing Sheets

LIQUID CRYSTAL PANEL AND LIQUID CRYSTAL DISPLAY APPARATUS

This application claims priority under 35 U.S.C. Section 119 to Japanese Patent Application No. 2004-367040 filed on Dec. 20, 2004 and Japanese Patent Application No. 2005-190515 filed on Jun. 29, 2005, which are herein incorporated by reference.

FIELD OF THE INVENTION

The present invention relates to a liquid crystal panel having a liquid crystal cell, a polarizer, and an optical element. Further, the present invention relates to a liquid crystal television and a liquid crystal display apparatus both using the liquid crystal panel.

DESCRIPTION OF THE RELATED ART

A liquid crystal display apparatus has attracted attention for its properties such as being thin, being lightweight, and having low power consumption, and is widely used in: portable devices such as a cellular phone and a watch; office automation (OA) devices such as a personal computer monitor and a laptop personal computer; and home appliances such as a video camera and a liquid crystal television. The use of the liquid crystal display apparatus has spread because disadvantages in that its display properties vary depending on an angle from which a screen is viewed and that the liquid crystal display apparatus cannot operate at high temperatures and very low temperatures have been overcome by technical innovations. However, wide-ranging uses have required different properties in according with the uses. For example, a conventional liquid crystal display apparatus has only to have viewing angle property of a contrast ratio between white/black displays of about 10 in an oblique direction. This definition derives from a contrast ratio of black ink printed on white paper of newspapers, magazines, and the like. However, use of the liquid crystal display apparatus for a large stationary television requires a display that can be viewed well from different viewing angles because several people view a screen at the same time. That is, a contrast ratio between white/black displays must be 20 or more, for example. A person viewing four corners of a screen of a large display without moving is comparable to a person viewing the screen from different viewing angle directions. Thus, it is important that the liquid crystal panel have uniform display without display unevenness across the entire screen.

A liquid crystal display apparatus (television, for example) provided with a liquid crystal cell generally employs an in-plane switching mode (IPS) as a drive mode. The IPS mode has such a feature in that homogeneously aligned liquid crystal molecules in the absence of an electric field are driven by a horizontal electric field to provide a display of clear colors. However, a conventional liquid crystal display apparatus provided with a liquid crystal cell of IPS mode has problems of deterioration in display properties such as: a reduced contrast ratio in an oblique direction; and variation in coloring (also referred to as color shift in an oblique direction) of images depending on a viewing angle.

There is disclosed a technique for solving the problem involving use of a λ/2 plate exhibiting a refractive index profile of nx>nz>ny (wherein, nx, ny, and nz respectively represent refractive indices in a slow axis direction, fast axis direction, and thickness direction of a film) for improving display properties in an oblique direction (JP 11-305217 A, for example). However, the disclosed technique provides insufficient improvement in contrast ratio in an oblique direction and color shift in an oblique direction, and further improvement in display properties is desired.

An aromatic polymer film such as a polycarbonate-based resin, a polyarylate-based resin, or a polyester-based resin had been heretofore used as the λ/2 plate exhibiting a refractive index profile of nx>nz>ny (JP 04-305602 A or JP 05-157911 A, for example). However, the aromatic polymer film has a large photoelastic coefficient and its retardation values may vary easily by stress. Thus, the aromatic polymer film has a problem in that display evenness degrades as described below. In a case where the aromatic polymer film attached between a liquid crystal cell and a polarizer is exposed to high temperatures, retardation values may depart from designed values due to shrinkage stress of the polarizer. Further, uneven stress generated by heat of backlight may cause unevenness in retardation values.

Meanwhile, a polymer film containing as main component an aliphatic resin film such as a cycloolefin-based resin film has a small photoelastic coefficient. However, such a film hardly causes retardation, and desired retardation values cannot be obtained through stretching at a low stretch ratio as in the aromatic polymer film, or even at a high stretch ratio. The stretching at a high stretch ratio causes a problem of breaking of the film. As a result, a retardation film which is an aliphatic resin film having a small photoelastic coefficient and a relationship of nx≧ny>nz has been obtained through a conventional technique (JP 2001-215332 A, for example), but no retardation film having a relationship of nx>nz>ny has been hitherto obtained.

SUMMARY OF THE INVENTION

A liquid crystal panel according to an embodiment of the present invention includes: a liquid crystal cell; a first polarizer arranged on one side of the liquid crystal cell; a second polarizer arranged on the other side of the liquid crystal cell; a first optical element and a second optical element arranged between the first polarizer and the liquid crystal cell; and a third optical element arranged between the second polarizer and the liquid crystal cell, wherein: the first optical element has substantially optically negative uniaxial property; the second optical element satisfies the following expressions (1) and (2) and is arranged between the first optical element and the liquid crystal cell; and the third optical element has substantially optical isotropy:

$$130 \text{ nm} \leq Re[590] \leq 250 \text{ nm} \quad (1)$$

$$0 \text{ nm} < Rth[590] < Re[590] \quad (2)$$

(in the expressions (1) and (2), Re[590] and Rth[590] respectively represent in-plane retardation and thickness direction retardation values determined by using light of a wavelength of 590 nm at 23° C.).

In one embodiment of the invention, the liquid crystal cell includes a liquid crystal layer containing homogeneously aligned liquid crystal molecules in the absence of an electric field.

In another embodiment of the invention, the liquid crystal layer has a refractive index profile of nx>ny=nz.

In still another embodiment of the invention, the liquid crystal layer includes IPS mode, FFS mode, or FLC mode.

In still another embodiment of the invention, an initial alignment direction of the liquid crystal cell is substantially parallel to a direction of an absorption axis of the second polarizer.

In still another embodiment of the invention, the initial alignment direction of the liquid crystal cell is substantially parallel to a direction of an absorption axis of the polarizer arranged on a backlight side of the liquid crystal cell. Alternatively, the initial alignment direction of the liquid crystal cell is substantially perpendicular to a direction of an absorption axis of the polarizer arranged on a backlight side of the liquid crystal cell.

In still another embodiment of the invention, an absolute value of a difference ($\Delta d=d1+d2-d3$) between a sum (d1+d2) of a thickness (d1) of the first optical element and a thickness (d2) of the second optical element, and a thickness (d3) of the third optical element is 120 μm or less.

In still another embodiment of the invention, the first optical element has Rth[590] of 10 nm to 100 nm.

In still another embodiment of the invention, the first optical element includes a polymer film containing a cellulose ester as a main component.

In still another embodiment of the invention, a slow axis of the second optical element is substantially parallel or perpendicular to an absorption axis of the first polarizer.

In still another embodiment of the invention, the second optical element has wavelength dispersion property of 0.8 to 1.2.

In still another embodiment of the invention, the second optical element has a refractive index profile of nx>nz>ny.

In still another embodiment of the invention, the second optical element includes a stretched film of a polymer film containing a norbornene-based resin.

In still another embodiment of the invention, the second optical element includes a stretched film of a polymer film containing a resin obtained through hydrogenation of a ring-opened polymer and/or ring-opened copolymer of a norbornene-based monomer.

In still another embodiment of the invention, the third optical element includes a polymer film containing as a main component at least one resin selected from the group consisting of a cellulose ester, a cycloolefin-based resin obtained through hydrogenation of a ring-opened polymer of a norbornene-based monomer, an addition copolymer of a norbornene-based monomer and an α-olefin monomer, and an addition copolymer of a maleimide-based monomer and an olefin monomer.

According to another aspect of the invention, a liquid crystal television is provided. The liquid crystal television includes the above-mentioned liquid crystal panel.

According to still another aspect of the invention, a liquid crystal display apparatus is provided. The liquid crystal display apparatus includes the above-mentioned liquid crystal panel.

In one embodiment of the invention, the liquid crystal display apparatus has a maximum contrast ratio of 600 or more and a minimum contrast ratio of 60 or more at an azimuth angle of 45° and a polar angle of 0° to 78°.

In another embodiment of the invention, the liquid crystal display apparatus has a color shift of 0.1 to 1.0 at an azimuth angle of 45° and a polar angle of 60°.

In the liquid crystal panel of the present invention, specific members (typically, retardation film) are arranged in a specific positional relationship, thereby being capable of improving display properties of the liquid crystal display apparatus. To be specific, the first optical element having substantially optically negative uniaxial property, and the second optical element satisfying the following expressions (1) and (2) are arranged between the polarizer on one side (in one embodiment, a viewer side) and the liquid crystal cell (the second optical element is arranged between the first optical element and the liquid crystal cell). In addition, the third optical element having substantially optical isotropy is arranged between the polarizer on another side (in one embodiment, a backlight side) and the liquid crystal cell. Thus, a contrast ratio in an oblique direction can be increased, and a color shift in an oblique direction can be reduced.

$$130 \text{ nm} \leq Re[590] \leq 250 \text{ nm} \quad (1)$$

$$0 \text{ nm} < Rth[590] < Re[590] \quad (2)$$

In particular, effects of the arrangement are remarkable in a liquid crystal display apparatus provided with a liquid crystal cell including a liquid crystal layer, which contains homogeneously aligned liquid crystal molecules in the absence of an electric field.

In addition, according to a preferred embodiment of the present invention, a shrinkable film having a predetermined shrinkage ratio is attached to each side of a polymer film as a second optical element containing a resin obtained through hydrogenation of a ring-opened polymer and/or ring-opened copolymer of a norbornene-based monomer, and the whole is stretched, to thereby actually provide a retardation film (second optical element) having a small photoelastic coefficient, having a relationship of nx>nz>ny, and satisfying the expressions (1) and (2). No retardation film having a small photoelastic coefficient and having a relationship of nx>nz>ny has been heretofore obtained. The second optical element of the present invention includes a stretched film of a polymer film containing a resin obtained through hydrogenation of a ring-opened polymer and/or ring-opened copolymer of a norbornene-based monomer, and has a small photoelastic coefficient, to thereby prevent unevenness in retardation values due to shrinkage stress of the polarizer or heat of backlight of the liquid crystal panel. As a result, a liquid crystal display apparatus with excellent display uniformity having uniform display properties across an entire liquid crystal panel can be obtained. Actual production of a retardation film having a small photoelastic coefficient and a relationship of nx>nz>ny is one significant accomplishment of the present invention.

In addition, according to a preferred embodiment of the present invention, an absolute value of a difference between a sum of a thickness of the first optical element and a thickness of the second optical element, and a thickness of the third optical element is adjusted to 120 μm or less, to thereby provide a liquid crystal display apparatus with better display uniformity. Use of an optical film having a small photoelastic coefficient has been heretofore known to prevent unevenness due to distortion of the optical film, but display properties are hardly improved across the entire liquid crystal panel. Significant improvement in display uniformity of the liquid crystal display apparatus by arrangement of optical elements having specific optical properties in specific positions of the liquid crystal panel and by selection of the materials and thickness of the optical elements is a finding obtained for the first time through actual production of such a liquid crystal display apparatus, and an unexpected excellent effect.

DESCRIPTION OF THE PREFERRED EMBODIMENTS

A. Outline of Entire Liquid Crystal Panel

Figure 1:
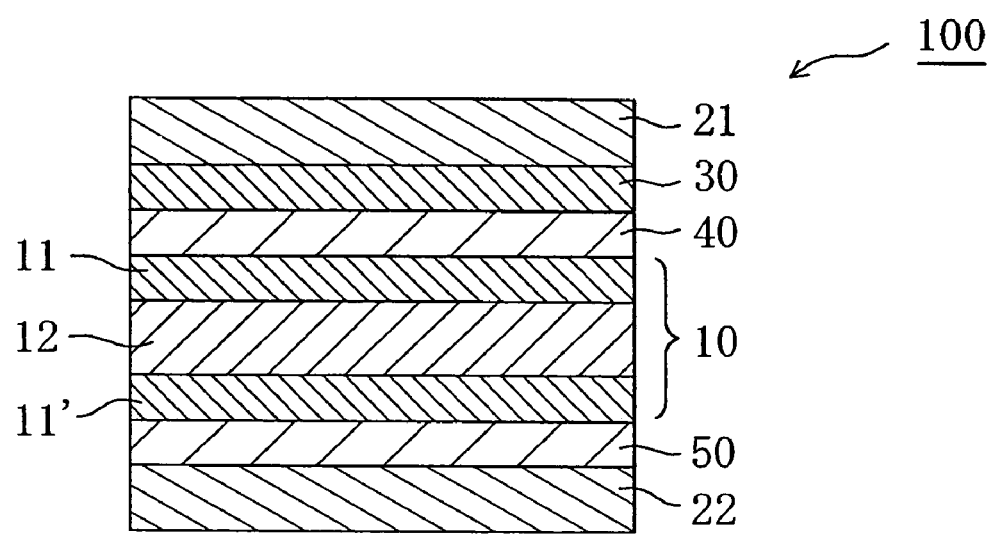
FIG. 1 is a schematic sectional view of a liquid crystal panel according to a preferred embodiment of the present invention.
Figure 2A:
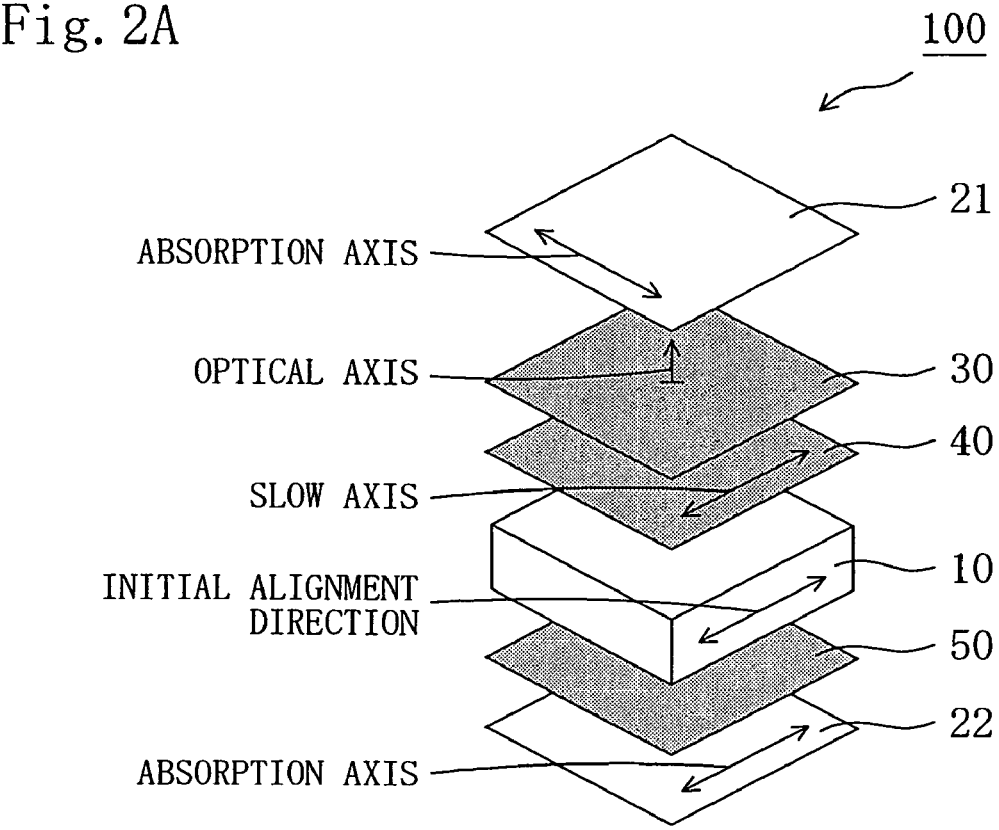
FIG. 2A is a schematic perspective view of the liquid crystal panel of FIG. 1 employing O-mode.
Figure 2B:
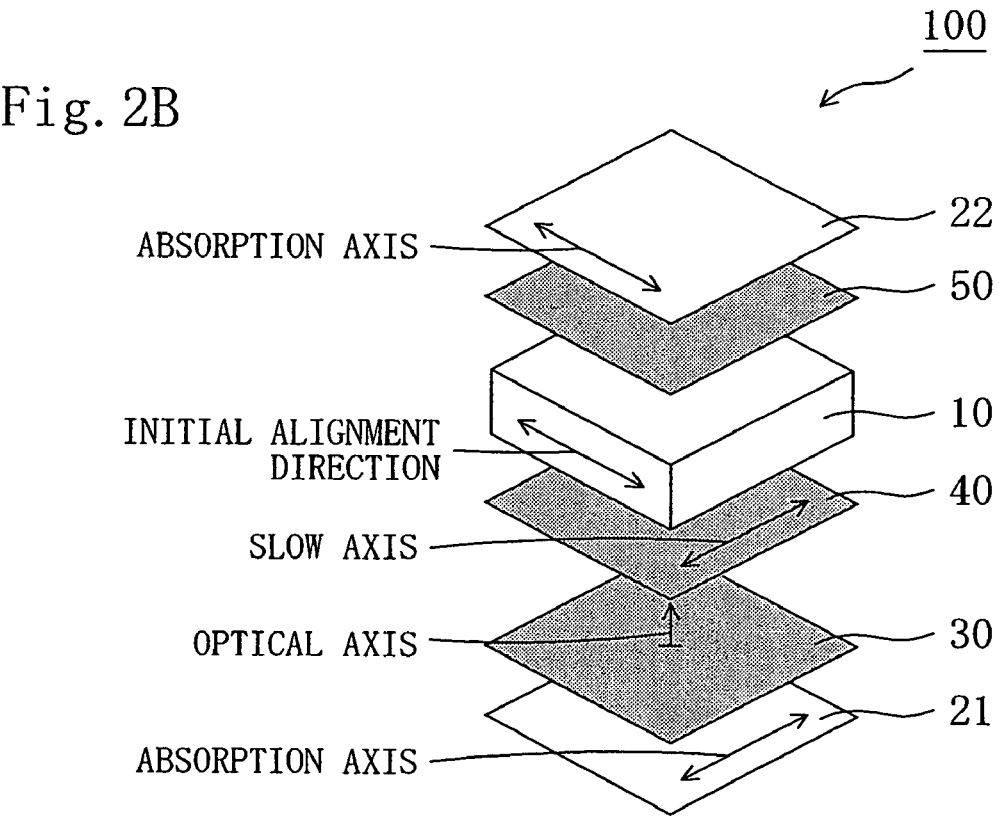
FIG. 2B is a schematic perspective view of a liquid crystal panel employing E-mode.

FIG. 1 is a schematic sectional view of a liquid crystal panel according to a preferred embodiment of the present invention. FIG. 2A is a schematic perspective view of the liquid crystal panel employing O-mode, and FIG. 2B is a schematic perspective view of the liquid crystal panel employing E-mode. Note that, a ratio among length, width, and thickness of each member in FIGS. 1, 2A, and 2B is different from that of an actual member for clarity. A liquid crystal panel 100 is provided with: a liquid crystal cell 10 including a liquid crystal layer; a first polarizer 21 arranged on one side (viewer side in FIG. 2A) of the liquid crystal cell 10; a second polarizer 22 arranged on the other side (backlight side in FIG. 2A) of the liquid crystal cell 10; a first optical element 30 and a second optical element 40 arranged between the first polarizer 21 and the liquid crystal cell 10; and a third optical element 50 arranged between the second polarizer 22 and the liquid crystal cell 10. For practical use, any appropriate protective layer (not shown) may be arranged on outer sides of the first polarizer 21 and the second polarizer 22. FIG. 2A shows a case where an absorption axis of the first polarizer 21 and a slow axis of the second optical element 40 are perpendicular to each other. However, the absorption of the first polarizer 21 and the slow axis of the second optical element 40 maybe parallel to each other. FIG. 2B shows a case where the absorption axis of the first polarizer 21 and the slow axis of the second optical element 40 are parallel to each other. However, the absorption of the first polarizer 21 and the slow axis of the second optical element 40 may be perpendicular to each other. The first optical element 30 has substantially optically negative uniaxial property. The second optical element 40 satisfies the following expressions (1) and (2) and is arranged between the first optical element 30 and the liquid crystal cell 10:

$$130 \text{ nm} \leq Re[590] \leq 250 \text{ nm} \quad (1)$$

$$0 \text{ nm} < Rth[590] < Re[590] \quad (2)$$

(in the expressions (1) and (2), Re[590] and Rth[590] respectively represent in-plane retardation and thickness direction retardation values determined by using light of a wavelength of 590 nm at 23° C.). Further, the third optical element 50 has substantially optical isotropy. Such specific optical elements are laminated on the liquid crystal cell respectively, to thereby allow excellent optical compensation and realize a liquid crystal display apparatus having a large contrast ratio in an oblique direction and a small color shift in an oblique direction.

The second polarizer 22 (i.e., the polarizer adjacent to the third optical element 50) is preferably arranged such that its absorption axis is substantially parallel to an initial alignment direction of the liquid crystal cell 10. The first polarizer 21 is preferably arranged such that its absorption axis is substantially perpendicular to the initial alignment direction of the liquid crystal cell 10.

The liquid crystal panel of the present invention may be of so-called O-mode or so-called E-mode. The term "liquid crystal panel of O-mode" refers to a liquid crystal panel in which an absorption axis of a polarizer arranged on a backlight side of a liquid crystal cell and an initial alignment direction of the liquid crystal cell are parallel to each other. The term "liquid crystal panel of E-mode" refers to a liquid crystal panel in which an absorption axis of a polarizer arranged on a backlight side of a liquid crystal and an initial alignment direction of the liquid crystal cell are perpendicular to each other. In the liquid crystal panel of O-mode as shown in FIG. 2A, the first polarizer 21, the first optical element 30 and the second optical element 40 are preferably arranged on a viewer side of the liquid crystal cell 10, and the third optical element 50 and the second polarizer 22 are preferably arranged on a backlight side of the liquid crystal cell 10. In the liquid crystal panel of E-mode as shown in FIG. 2B, the first polarizer 21, the first optical element 30 and the second optical element 40 are preferably arranged on a backlight side of the liquid crystal panel 10, and the third optical element 50 and the second polarizer 22 are preferably arranged on a viewer side of the liquid crystal cell 10. In the present invention, a liquid crystal panel of O-mode as shown in FIG. 2A is preferred because an arrangement of O-mode can realize better optical compensation. To be specific, in the arrangement of O-mode, the first and second optical elements including the retardation film are arranged on a far side from backlight and thus hardly receives adverse effects due to heat of backlight, to thereby provide a liquid crystal display apparatus with little display unevenness.

An absolute value of a difference ($\Delta d = d1 + d2 - d3$) between a sum ($d1+d2$) of a thickness ($d1$) of the first optical element 30 and a thickness ($d2$) of the second optical element 40, and a thickness ($d3$) of the third optical element 50 is preferably 120 μm or less, more preferably 80 μm or less, and particularly preferably 60 μm or less. An absolute value of the difference within the above ranges can prevent unevenness in retardation values due to heat of backlight of the liquid crystal panel, and can provide a liquid crystal display apparatus with excellent display uniformity.

The liquid crystal panel of the present invention is not limited to the embodiments described above, and other members (such as isotropic optical adhesive and isotropic film) may be arranged between the members shown in FIG. 1. Hereinafter, detailed description will be given of members of the liquid crystal panel according to the present invention.

B. Liquid Crystal Cell

Referring to FIG. 1, the liquid crystal cell 10 used in the liquid crystal panel of the present invention is provided with: a pair of substrates 11 and 11'; and a liquid crystal layer 12 as a display medium arranged between the substrates 11 and 11'. One substrate (color filter substrate) 11 is provided with color filters and black matrix (either not shown). The other substrate (active matrix substrate) 11' is provided with: a switching element (typically TFT, not shown) for controlling electrooptic properties of liquid crystals; a scanning line (not shown) for providing a gate signal to the switching element and a signal line (not shown) for providing a source signal thereto; and a pixel electrode and a counter electrode (either not shown). The color filters may be provided in the active matrix substrate 11' as well. A distance (cell gap) between the substrates 11 and 11' is controlled by a spacer (not shown). An alignment film (not shown) formed of, for example, polyimide is provided on a side of each of the substrates 11 and 11' in contact with the liquid crystal layer 12.

The liquid crystal layer 12 preferably includes homogeneously aligned liquid crystals in the absence of an electric field. Such a liquid crystal layer (eventually, liquid crystal cell) generally exhibits a refractive index profile of nx>ny=nz (wherein, nx, ny, and nz respectively represent refractive indices in a slow axis direction, fast axis direction, and thickness direction of a film). In the specification of the present invention, ny=nz includes not only a case where ny and nz are perfectly equal, but also a case where ny and nz are substantially equal. Further, the phrase "initial alignment direction of the liquid crystal cell" refers to a direction providing a maximum in-plane refractive index of the liquid crystal layer by alignment of nematic liquid crystal molecules in the liquid crystal layer in the absence of an electric field. Typical examples of drive mode using the liquid crystal layer exhibiting such refractive index profile include: in-plane switching (IPS) mode; fringe field switching (FFS) mode; and ferroelectric liquid crystal (FLC) mode. Specific examples of liquid crystals used for those drive modes include nematic liquid crystals and smectic liquid crystals. For example, the nematic liquid crystals are used for the IPS mode and the FFS mode, and the smectic liquid crystals are used for the FLC mode.

In the IPS mode, homogeneously aligned nematic liquid crystals in the absence of an electric field respond in an electric field parallel to substrates (also referred to as a horizontal electric field) generated between a counter electrode and a pixel electrode each formed of metal, for example, by utilizing an electrically controlled birefringence (ECB) effect. To be specific, as described in "Monthly Display July" (p. 83 to p. 88, published by Techno Times Co., Ltd., 1997) or "Ekisho vol. 2, No. 4" (p. 303to p. 316, published by Japanese Liquid Crystal Society, 1998), normally black mode provides completely black display in the absence of an electric field by: aligning an alignment direction of the liquid crystal cell with an absorption axis of one polarizer in the absence of application of an electric field; and arranging the polarizing plates above and below the liquid crystal cell to be perpendicular to each other. Under application of an electric field, liquid crystal molecules rotate while remaining parallel with substrates, to thereby obtain a transmittance in accordance with a rotation angle. The IPS mode includes super in-plane switching (S-IPS) mode and advanced super in-plane switching (AS-IPS) mode employing a V-shaped electrode, a zigzag electrode, or the like. Examples of a commercially available liquid crystal display apparatus of IPS mode include: 20-inch wide liquid crystal television "Wooo" (trade name, manufactured by Hitachi, Ltd.); 19-inch liquid crystal display "ProLite E481S-1" (trade name, manufactured by Iiyama Corporation); and 17-inch TFT liquid crystal display "FlexScan L565" (trade name, manufactured by Eizo Nanao Corporation).

In the FFS mode, homogeneously aligned nematic liquid crystals in the absence of an electric field respond in an electric field parallel to substrates (also referred to as a horizontal electric field) and generated between a counter electrode and a pixel electrode each formed of transparent conductor, for example, by utilizing an electrically controlled birefringence (ECB) effect. The horizontal electric field in FFS mode is referred to as a fringe electric field, which can be generated by setting a distance between the counter electrode and the pixel electrode each formed of transparent conductor narrower than a cell gap. To be specific, as described in "Society for Information Display (SID) 2001 Digest" (p. 484 to p. 487) or JP 2002-031812 A, normally black mode provides completely black display in the absence of an electric field by: aligning an alignment direction of the liquid crystal cell with an absorption axis of one polarizer in the absence of application of an electric field; and arranging polarizing plates above and below the liquid crystal cell to be perpendicular to each other. Under application of an electric field, liquid crystal molecules rotate while remaining parallel with substrates, to thereby obtain a transmittance in accordance with a rotation angle. The FFS mode includes advanced fringe field switching (A-FFS) mode or ultra fringe field switching (U-FFS) mode employing a V-shaped electrode, a zigzag electrode, or the like. An example of a commercially available liquid crystal display apparatus of FFS mode includes Tablet PC "M1400" (trade name, manufactured by Motion Computing, Inc.).

The FLC mode utilizes property of ferroelectric chiral smectic liquid crystals encapsulated between electrode substrates each having a thickness of about 1 to 2 μm to exhibit two states of stable molecular alignment, for example. To be specific, the ferroelectric chiral smectic liquid crystal molecules rotate within a plane parallel to the substrates and respond due to application of a voltage. The FLC mode can provide black and white displays based on the same principle as those of the IPS mode and the FFS mode. The FLC mode has such a feature in that a response speed is high compared with those in other drive modes. In the specification of the present invention, the FLC mode includes: surface stabilized ferroelectric liquid crystal (SS-FLC) mode; anti ferroelectric liquid crystal (AFLC) mode; polymer stabilized ferroelectric liquid crystal (PS-FLC) mode; and V-shaped switching ferroelectric liquid crystal (V-FLC) mode.

The homogeneously aligned nematic liquid crystals are obtained as a result of interaction between substrates subjected to alignment treatment and nematic liquid crystal molecules, in which alignment vectors of the nematic liquid crystal molecules are parallel to a substrate plane and uniformly aligned. In the specification of the present invention, homogenous alignment includes a case where the alignment vectors are slightly inclined with respect to the substrate plane, that is, a case where the nematic liquid crystal molecules are pretilted. In a case where the nematic liquid crystals are pretilted, a pretilt angle is preferably 20° or less for maintaining a large contrast ratio and obtaining good display properties.

Any appropriate nematic liquid crystals may be employed as the nematic liquid crystals in accordance with the purpose. The nematic liquid crystals may have positive dielectric anisotropy or negative dielectric anisotropy. A specific example of the nematic liquid crystals having positive dielectric anisotropy includes "ZLI-4535" (trade name, manufactured by Merck Ltd., Japan). A specific example of the nematic liquid crystals having negative dielectric anisotropy includes "ZLI-2806" (trade name, manufactured by Merck Ltd., Japan). A difference between an ordinary refractive index (no) and an extraordinary refractive index (ne), that is, a birefringence ($\Delta n_{LC}$) can be appropriately set in accordance with response speed of the liquid crystals, transmittance, and the like. However, the birefringence is preferably 0.05 to 0.30, in general.

Any appropriate smectic liquid crystals may be employed as the smectic liquid crystals in accordance with the purpose. The smectic liquid crystals to be used preferably have an asymmetric carbon atom in a part of a molecular structure and exhibit ferroelectric property (also referred to as ferroelectric liquid crystals). Specific examples of the smectic liquid crystals exhibiting ferroelectric property include: p-decyloxybenzylidene-p'-amino-2-methylbutylcinnamate; p-hexyloxybenzylidene-p'-amino-2-chloropropylcinnamate; and 4-o-(2-methyl)butylresorcylidene-4'-octylaniline. Examples of commercially available ferroelectric liquid crystals include: ZLI-5014-000 (trade name, capacitance of 2.88 nF, spontaneous polarization of −2.8C/cm², manufactured by Merck Ltd.); ZLI-5014-100 (trade name, capacitance of 3.19 nF, spontaneous polarization of −20.0 C/cm², manufactured by Merck Ltd.); and FELIX-008 (trade name, capacitance of 2.26 nF, spontaneous polarization of −9.6 C/cm², manufactured by Hoechst Aktiengesellschaft).

Any appropriate cell gap may be employed as the cell gap (distance between substrates) of the liquid crystal cell in accordance with the purpose. However, the cell gap is preferably 1.0 to 7.0 µm. A cell gap within the above range can reduce response time and provide good display properties.

C. Polarizer

In the specification of the present invention, a polarizer refers to an optical film capable of converting natural light or polarized light into appropriate polarized light. Any appropriate polarizer may be employed as a polarizer used for a polarizing plate of the present invention. Preferably, a film capable of converting natural light or polarized light into linearly polarized light is used.

The polarizer may have any appropriate thickness. The thickness of the polarizer is typically 5 µm to 80 µm, preferably 10 µm to 50 µm, and more preferably 20 µm to 40 µm. A thickness of the polarizer within the above ranges can provide excellent optical properties and mechanical strength.

C-1. Optical Properties of Polarizer

A light transmittance (single axis transmittance) of the polarizer is preferably 41% or more, and more preferably 43% or more measured by using light of a wavelength of 440 nm at 23° C. A theoretical upper limit of the single axis transmittance is 50%. A degree of polarization is preferably 99.8% to 100%, and more preferably 99.9% to 100%. A light transmittance and a degree of polarization within the above ranges can further increase a contrast ratio in a normal direction of a liquid crystal display apparatus employing the polarizer.

The single axis transmittance and the degree of polarization can be determined by using a spectrophotometer "DOT-3" (trade name, manufactured by Murakami Color Research Laboratory). The degree of polarization can be determined by: measuring a parallel light transmittance ($H_0$) and a perpendicular light transmittance ($H_{90}$) of the polarizer; and using the following equation. Degree of polarization (%)=$\{(H_0-H_{90})/(H_0+H_{90})\}^{1/2} \times 100$. The parallel light transmittance ($H_0$) refers to a transmittance of a parallel laminate polarizer produced by piling two identical polarizers such that respective absorption axes are parallel to each other. The perpendicular light transmittance ($H_{90}$) refers to a transmittance of a perpendicular laminate polarizer produced by piling two identical polarizers such that respective absorption axes are perpendicular to each other. The light transmittance refers to a Y value obtained through color correction by a two-degree field of view (C source) in accordance with JIS Z8701-1982.

C-2. Means for Arranging Polarizer

Referring to FIGS. 1, 2A, and 2B, any appropriate method may be employed as a method of arranging the first polarizer 21 and the second polarizer 22 depending on the purpose. Preferably, the first polarizer 21 and the second polarizer 22 are each provided with an adhesive layer or a pressure sensitive adhesive layer (not shown) on a surface opposing the liquid crystal cell. Further, the first polarizer 21 is attached to a surface of the first optical element 30, and the second polarizer 22 is attached to a surface of the third optical element 50, to thereby further increase a contrast ratio of a liquid crystal display apparatus employing the polarizers.

A thickness of the adhesive layer or pressure sensitive adhesive layer may be appropriately determined in accordance with intended use, adhesive strength, and the like. The adhesive layer has a thickness of generally 0.1 µm to 50 µm, preferably 0.1 µm to 20 µm, and particularly preferably 0.1 µm to 10 µm. The pressure sensitive adhesive layer has a thickness of generally 1 µm to 100 µm, preferably 5 µm to 80 µm, and particularly preferably 10 µm to 50 µm.

Any appropriate adhesive or pressure sensitive adhesive may be employed for forming the adhesive layer or the pressure sensitive adhesive layer in accordance with the kind of adherend. In particular, in a case where a polymer film containing a polyvinyl alcohol-based resin as a main component is used for the polarizer, an aqueous adhesive is preferably used as the adhesive. An adhesive containing a polyvinyl alcohol-based resin as a main component is more preferably used. A specific example thereof is an adhesive "GOHSEFIMER Z200" (trade name, available from Nippon Synthetic Chemical Industry Co., Ltd.) containing as a main component modified polyvinyl alcohol having an acetoacetyl group. An acrylic pressure sensitive adhesive containing an acrylic polymer as a base polymer is preferably used from viewpoints of excellent optical transparency, appropriate pressure sensitive adhesive properties such as wetting property, agglomeration property, and adhesiveness, and excellent weatherability and heat resistance. A specific example thereof is a double-face optical tape "SK-2057" (trade name, available from Soken Chemical & Engineering Co., Ltd.) containing an acrylic pressure sensitive adhesive as a pressure sensitive adhesive layer.

The first polarizer 21 is preferably arranged such that its absorption axis is substantially perpendicular to an absorption axis of the second polarizer 22. In the specification of the present invention, the phrase "substantially perpendicular" includes a case where two optical axes (the absorption axis of the first polarizer 21 and the absorption axis of the second polarizer 22) form an angle of 90°±2.0°, preferably 90°±1.0°, and more preferably 90°±0.5°. An angle greatly departing from the above ranges tends to cause deterioration in contrast of a liquid crystal display apparatus.

C-3. Optical Film Used for Polarizer

The polarizers described above are each formed of a stretched film of a polymer film containing a polyvinyl alcohol-based resin as a main component, which contains a dichromatic substance, for example. The polymer film containing a polyvinyl alcohol-based resin as a main component is produced through a method described in [Example 1] of JP 2000-315144 A, for example.

The polyvinyl alcohol-based resin to be used may be prepared by: polymerizing a vinyl ester-based monomer to obtain a vinyl ester-based polymer; and saponifying the vinyl ester-based polymer to convert vinyl ester units into vinyl alcohol units. Examples of the vinyl ester-based monomer include vinyl formate, vinyl acetate, vinyl propionate, vinyl valerate, vinyl laurate, vinyl stearate, vinyl benzoate, vinyl pivalate, and vinyl versatate. Of those, vinyl acetate is preferred.

The polyvinyl alcohol-based resin may have any appropriate average degree of polymerization. The average degree of polymerization is preferably 1,200 to 3,600, more preferably 1,600 to 3,200, and most preferably 1,800 to 3,000. The average degree of polymerization of the polyvinyl alcohol-based resin can be determined through a method in accordance with JIS K6726-1994.

A degree of saponification of the polyvinyl alcohol-based resin is preferably 90.0 mol % to 99.9 mol %, more preferably 95.0 mol % to 99.9 mol %, and most preferably 98.0 mol % to 99.9 mol % from the viewpoint of durability of the polarizer.

The degree of saponification refers to a ratio of units actually saponified into vinyl alcohol units to units which may be converted into vinyl alcohol units through saponification. The degree of saponification of the polyvinyl alcohol-based resin may be determined in accordance with JIS K6726-1994.

The polymer film containing a polyvinyl alcohol-based resin as a main component to be used in the present invention may preferably contain polyvalent alcohol as a plasticizer. Examples of the polyvalent alcohol include ethylene glycol, glycerin, propylene glycol, diethylene glycol, triethylene glycol, tetraethylene glycol, and trimethylolpropane. Such polyvalent alcohol may be used independently or in combination. In the present invention, ethylene glycol or glycerin is preferably used from the viewpoints of stretchability, transparency, thermal stability, and the like.

A use amount of the polyvalent alcohol in the present invention is preferably 1 to 30 (weight ratio), more preferably 3 to 25 (weight ratio), and most preferably 5 to 20 (weight ratio) with respect to a total solid content in the polyvinyl alcohol-based resin as 100. A use amount of the polyvalent alcohol within the above ranges can further enhance coloring property or stretchability.

Any appropriate dichromatic substance may be employed as the dichromatic substance. Specific examples thereof include iodine and a dichromaticdye. In the specification of the present invention, the term "dichromatic" refers to optical anisotropy in which light absorption differs in two directions of an optical axis direction and a direction perpendicular thereto.

Examples of the dichromatic dye include Red BR, Red LR, Red R, Pink LB, Rubin BL, Bordeaux GS, Sky Blue LG, Lemon Yellow, Blue BR, Blue 2R, Navy RY, Green LG, Violet LB, Violet B, Black H, Black B, Black GSP, Yellow 3G, Yellow R, Orange LR, Orange 3R, Scarlet GL, Scarlet KGL, Congo Red, Brilliant Violet BK, Supra Blue G, Supra Blue GL, Supra Orange GL, Direct Sky Blue, Direct Fast Orange S, and Fast Black.

Figure 3:
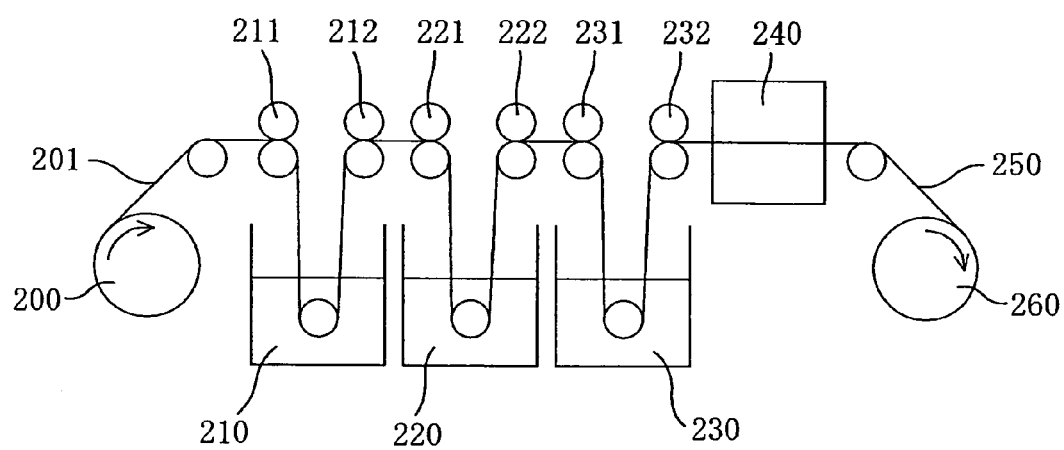
FIG. 3 is a schematic diagram showing a concept of a typical production process of a polarizer used in the present invention.

An example of a method of producing a polarizer will be described by referring to FIG. 3. FIG. 3 is a schematic diagram showing a concept of a typical production process of a polarizer used in the present invention. For example, a polymer film 201 containing a polyvinyl alcohol-based resin as a main component is fed from a feed roller 200, immersed in an aqueous iodine solution bath 210, and subjected to swelling and coloring treatment under tension in a longitudinal direction of the film by rollers 211 and 212 at different speed ratios. Next, the film is immersed in a bath 220 of an aqueous solution containing boric acid and potassium iodide, and subjected to crosslinking treatment under tension in a longitudinal direction of the film by rollers 221 and 222 at different speed ratios. The film subjected to crosslinking treatment is immersed in a bath 230 of an aqueous solution containing potassium iodide by rollers 231 and 232, and subjected to water washing treatment. The film subjected to water washing treatment is dried by drying means 240 to adjust its moisture content, and taken up in a take-up part 260. The polymer film containing a polyvinyl alcohol-based resin as a main component may be stretched to a 5 to 7 times length of the original length through the above process, to thereby provide a polarizer 250.

The polarizer may have any appropriate moisture content, but the moisture content is preferably 5% to 40%, more preferably 10% to 30%, and most preferably 20% to 30%.

In addition to the above-described polarizer, further examples of the polarizer to be used in the present invention include: a polarizer prepared by stretching a polymer film incorporating a dichromatic substance; an O-type polarizer of guest/host-type prepared by aligning in a specific direction a liquid crystal composition containing a dichromatic substance and a liquid crystal compound (U.S. Pat. No. 5,523,863); and an E-type polarizer prepared by aligning lyotropic liquid crystals in a specific direction (U.S. Pat. No. 6,049,428).

In the liquid crystal panel of the present invention, the polarizers arranged on both sides of the liquid crystal cell may be identical to or different from each other.

D. First Optical Element

Referring to FIGS. 1, 2A, and 2B, the first optical element 30 is arranged between the first polarizer 21 and the second optical element 40. In such embodiment, the first optical element serves as a protective layer on a cell side of the polarizer to prevent deterioration of the polarizer. As a result, high display properties of the liquid crystal display apparatus can be maintained for a long period of time. The first optical element 30 has substantially optically negative uniaxial property. An optical element having optically negative uniaxial property ideally has an optical axis in a normal direction. In the specification of the present invention, the phrase "optical element having optically negative uniaxial property" (also referred to as negative C plate) refers to an optical element satisfying a refractive index profile of $n_x = n_y > n_z$ (where, $n_x$ and $n_y$ represent main in-plane refractive indices and nz represents a thickness direction refractive index). The refractive index profile is not strictly limited to nx=ny, and the optical element has only to have a small difference in in-plane refractive indices (nx≈ny) without adversely affecting the display properties of the liquid crystal display apparatus in practical use. To be specific, the first optical element has an in-plane retardation value (Re[590]) of preferably 0 nm to 10 nm, more preferably 0 nm to 5 nm, and most preferably 0 nm to 3 nm determined by using light of a wavelength of 590 nm at 23° C.

In the present invention, the first optical element is used in combination with the second optical element for reducing light leak in an oblique direction of the liquid crystal panel. In general, in a liquid crystal panel having two polarizers arranged on both sides of a liquid crystal cell such that respective absorption axes are perpendicular to each other, light hardly leaks in a normal direction but light leaks in an oblique direction. In a case where the absorption axes of the polarizers are arranged at 0° and 90°, respectively, an amount of light leak tends to maximize in an oblique direction at 45°. An amount of light leak is reduced, to thereby increase a contrast ratio in an oblique direction and reduce a color shift in an oblique direction.

D-1. Optical Properties of First Optical Element

Re[590] of the first optical element is as described above. Re[590] can be determined from an equation Re[590]=(nx−ny)×d (wherein, nx and ny respectively represent refractive indices of an optical element (or a retardation film) in a slow axis direction and a fast axis direction at a wavelength of 590 nm, and d (nm) represents a thickness of the optical element (or the retardation film)) Note that, the slow axis refers to a direction providing a maximum in-plane refractive index.

In the specification of the present invention, Rth[590] refers to a thickness direction retardation value measured by light of a wavelength of 590 nm at 23° C. Rth[590] can be determined from an equation Rth[590]=(nx−nz)×d (wherein, nx and nz respectively represent refractive indices of the optical element (or the retardation film) in a slow axis direction and a thickness direction at a wavelength of 590 nm, and d (nm) represents a thickness of the optical element (or the retardation film)).

The first optical element used in the present invention has Rth[590] of preferably 10 to 100 nm, more preferably 20 to 80 nm, and most preferably 30 to 50 nm. Rth[590] within the above range can provide excellent optical compensation for a liquid crystal cell in a case where the first optical element is used in combination with the second and third optical elements described below.

Re[590] and Rth[590] maybe determined by using "KOBRA-21ADH" (trade name, manufactured by Oji Scientific Instruments). Refractive indices nx, ny, and nz can be determined by: using an in-plane retardation value (Re) of the optical element measured at a wavelength of 590 nm at 23° C., a retardation value (R40) measured by inclining a slow axis by 40° as a tilt angle, a thickness (d) of the optical element (or the retardation film), and an average refractive index (n0) of the optical element (or the retardation film); and using the following equations (i) to (iii) for computational numerical calculation. Then, Rth can be calculated from the following equation (iv). Here, φ and ny' are represented by the following respective equations (v) and (vi).

$$Re=(nx-ny)\times d \quad (i)$$

$$R40=(nx-ny')\times d/\cos(\phi) \quad (ii)$$

$$(nx+ny+nz)/3=n0 \quad (iii)$$

$$Rth=(nx-nz)\times d \quad (iv)$$

$$\phi=\sin^{-1}[\sin(40°)/n0] \quad (v)$$

$$ny'=ny\times nz/[ny^2\times\sin^2(\phi)+nz^2\times\cos^2(\phi)]^{1/2} \quad (vi)$$

D-2. Means for Arranging First Optical Element

Referring to FIGS. 1, 2A, and 2B, any appropriate method may be employed as a method of arranging the first optical element 30 between the first polarizer 21 and the second optical element 40 depending on the purpose. Preferably, the first optical element 30 is provided with an adhesive layer or a pressure sensitive adhesive layer on each side, and is attached to the first polarizer 21 and the second optical element 40. A gap between the optical elements is filled with the adhesive layer or the pressure sensitive adhesive layer, to thereby prevent shift in relationship among optical axes of the respective optical elements and damages of the optical elements through abrasion to each other when the optical elements are incorporated into a liquid crystal display apparatus. Further, interface reflection between layers of optical elements may be reduced, and contrast ratios of a liquid crystal display apparatus employing optical elements in a normal direction and an oblique direction may be increased.

A thickness of the adhesive layer or pressure sensitive adhesive layer may be appropriately determined in accordance with intended use, adhesive strength, and the like. The adhesive layer has a thickness of preferably 0.1 µm to 50 µm, more preferably 0.1 µm to 20 µm, and particularly preferably 0.1 µm to 10 µm. The pressure sensitive adhesive layer has a thickness of preferably 1 µm to 100 µm, more preferably 5 µm to 80 µm, and particularly preferably 10 µm to 50 µm.

Any appropriate adhesive or pressure sensitive adhesive may be employed for forming the adhesive layer or the pressure sensitive adhesive layer. Examples of the adhesive include a thermoplastic adhesive, a hot-melt adhesive, a rubber-based adhesive, a heat-curable adhesive, a monomer reaction-type adhesive, an inorganic adhesive, and natural adhesive. Examples of the pressure sensitive adhesive include a solvent-type pressure sensitive adhesive, a non-aqueous emulsion-type pressure sensitive adhesive, an aqueous pressure sensitive adhesive, a hot-melt pressure sensitive adhesive, a liquid curable pressure sensitive adhesive, a curable pressure sensitive adhesive, and a pressure sensitive adhesive used in calendering. The pressure sensitive adhesive preferably used is a solvent-type pressure sensitive adhesive (also referred to as acrylic pressure sensitive adhesive) containing an acrylic polymer as a base polymer from the viewpoints of excellent optical transparency, appropriate pressure sensitive adhesive properties such as wetting property, agglomeration property, and adhesiveness, and excellent weatherability and heat resistance. A specific example thereof is a double-face optical tape "SK-2057" (trade name, available from Soken Chemical & Engineering Co., Ltd.) containing an acrylic pressure sensitive adhesive as a pressure sensitive adhesive layer.

In a case where nx and ny of the first optical element 30 are completely identical, the first optical element 30 has no in-plane retardation and its slow axis is not detected. Thus, the first optical element 30 maybe arranged independently from the absorption axis of the first polarizer 21 and the slow axis of the second optical element 40. In a case where nx and ny of the first optical element 30 are substantially identical, but are slightly different, its slow axis may be detected. In this case, the first optical element 30 is preferably arranged such that its slow axis is substantially parallel or perpendicular to the absorption axis of the first polarizer 21. Arrangement of the first optical element 30 such that its slow axis greatly departs from being perpendicular or parallel to the absorption axis of the first polarizer 21 tends to deteriorate contrast of a liquid crystal display apparatus employing the first optical element 30.

D-3. Structure of First Optical Element

A structure (laminate structure) of the first optical element is not particularly limited as long as the first optical element satisfies the optical properties described in the above-mentioned section D-1. To be specific, the first optical element may be a single retardation film, or a laminate of two or more retardation films. The first optical element is preferably a single retardation film for reducing shift or unevenness in retardation values due to shrinkage stress of the polarizer or heat of backlight and for reducing a thickness of a liquid crystal panel. The first optical element as a laminate may include an adhesive layer or a pressure sensitive adhesive layer. In a case where the first optical element as a laminate includes two or more retardation films, the retardation films may be identical to or different from each other. Details of the retardation film will be described in the section D-4.

Rth[590] of the retardation film used for the first optical element can be appropriately selected in accordance with the number of retardation films to be used. For example, in a case where the first optical element is formed of a single retardation film, Rth[590] of the retardation film is preferably equal to Rth[590] of the first optical element. Thus, a retardation value of a pressure sensitive adhesive layer, an adhesive layer, or the like used for lamination of the first optical element on the first polarizer or the second optical element is preferably as small as possible. Further, in a case where the first optical element is a laminate including two or more retardation films, for example, total Rth[590] of the retardation films is preferably designed to be equal to Rth[590] of the first optical element. To be specific, in a case where two retardation films are laminated to form the first optical element having Rth[590] of 40 nm, retardation films each having Rth[590] of 20 nm are preferably used. Alternatively, a retardation film having Rth[590] of 10 nm and another retardation film having Rth[590] of 30 nm may be used. The two retardation films are preferably laminated such that the respective slow axes are perpendicular to each other, to thereby reduce Re[590]. The present specification describes the cases each employing two or less retardation films for simplicity, but the present invention may obviously be applied to a laminate including three or more retardation films.

A total thickness of the first optical element is preferably 10 μm to 200 μm, more preferably 20 μm to 120 μm, and particularly preferably 30 μm to 60 μm. The first optical element having a thickness within the above ranges may contribute to reduction in thickness of a liquid crystal display apparatus.

D-4. Retardation Film Used for First Optical Element

The retardation film used for the first optical element is not particularly limited, but a retardation film preferably used has excellent transparency, mechanical strength, thermal stability, water barrier property, and the like and hardly causes optical unevenness due to distortion.

The retardation film may have any appropriate thickness depending on the purpose. The thickness of the retardation film is preferably 5 μm to 100 μm, more preferably 10 μm to 90 μm, and particularly preferably 15 μm to 60 μm. A thickness of the retardation film within the above ranges can provide a retardation film with excellent mechanical strength and optical uniformity and satisfying the optical properties described in the above-mentioned section D-1.

An absolute value (C[590] (m$^2$/N)) of photoelastic coefficient of the retardation film is preferably $1 \times 10^{-12}$ to $200 \times 10^{-12}$, more preferably $1 \times 10^{-12}$ to $50 \times 10^{-12}$, and most preferably $1 \times 10^{-12}$ to $30 \times 10^{-12}$. A smaller absolute value of photoelastic coefficient hardly causes shift or unevenness in retardation values due to shrinkage stress of the polarizer or heat of backlight, to thereby provide a liquid crystal display apparatus with excellent display uniformity.

The retardation film has a light transmittance of preferably 80% or more, more preferably 85% or more, and most preferably 90% or more measured by using light of a wavelength of 590 nm at 23° C. The first optical element preferably has a similar light transmittance.

The retardation film is preferably a polymer film containing a thermoplastic resin as a main component. The thermoplastic resin may be a noncrystalline polymer or a crystalline polymer. The noncrystalline polymer has an advantage of exhibiting excellent transparency, and the crystalline polymer has advantages of exhibiting excellent rigidity, strength, and chemical resistance. The polymer film containing a thermoplastic resin as a main component may or may not be stretched.

Examples of the thermoplastic resin include: general purpose plastics such as polyethylene, polypropylene, polynorbornene, polyvinyl chloride, a cellulose ester, polystyrene, an ABS resin, an AS resin, polymethylmethacrylate, polyvinyl acetate, and polyvinylidene chloride; general purpose engineering plastics such as polyamide, polyacetal, polycarbonate, modified polyphenylene ether, polybutylene terephthalate, and polyethylene terephthalate; and super engineering plastics such as polyphenylene sulfide, polysulfone, polyethersulfone, polyetheretherketone, polyarylate, a liquid crystalline polymer, polyamideimide, polyimide and polytetrafluoroethylene. The thermoplastic resin may be used independently or in combination. The thermoplastic resin may be used after appropriate polymer modification. Examples of the polymer modification include copolymerization, crosslinking, and modifications in molecular terminals and stereoregularity. The retardation film used for the first optical element is particularly preferably a polymer film containing a cellulose ester as a main component.

Any appropriate cellulose ester may be employed as the cellulose ester. Specific examples thereof include organic acid esters such as cellulose acetate, cellulose propionate, and cellulose butyrate. The cellulose ester may be a mixed organic acid ester in which hydroxyl groups of cellulose are substituted partly by an acetyl group and partly by a propionyl group, for example. The cellulose ester is produced, for example, through a method described in paragraphs [0040] and [0041] of JP 2001-188128 A.

The cellulose ester has a weight average molecular weight (Mw) of preferably 20,000 to 300,000, more preferably 50,000 to 250,000, and particularly preferably 70,000 to 200,000. A weight average molecular weight of a cellulose ester within the above ranges can provide a transparent film with excellent thermal stability and mechanical strength.

Any appropriate forming method may be employed as a method of obtaining a polymer film containing the thermoplastic resin as a main component. Examples of the forming method include compression molding, transfer molding, injection molding, extrusion, blow molding, powder molding, FRP molding, and casting. Of those, casting is preferred because a highly smooth retardation film with small Re[590] and favorable optical uniformity (uniform in-plane and thickness direction retardation values, for example) can be obtained. To be specific, the casting involves: defoaming a rich solution (dope) prepared by dissolving in a solvent a resin composition containing a thermoplastic resin as a main component, a plasticizer, an additive, and the like; uniformly casting the defoamed solution into a thin film on a surface of an endless stainless belt or rotating drum; and evaporating the solvent to produce a film.

The conditions for forming a polymer film containing the thermoplastic resin as a main component may be appropriately selected in accordance with the composition or kind of the resin, the forming method, and the like. In casting, examples of the solvent used include cylopentanone, cyclohexanone, methyl isobutyl ketone, toluene, ethyl acetate, dichloromethane, chloroform, and tetrahydrofuran. Each of those solvents can provide a retardation film with high optical uniformity. A drying temperature of the solvent is preferably 50° C. to 250° C., and more preferably 80° C. to 150° C. A drying temperature of the solvent within the above ranges can provide a retardation film with small Re[590] and high optical uniformity. Rth[590] can be appropriately adjusted in accordance with the drying conditions, the thickness of the film formed, and the like.

The polymer film containing the thermoplastic resin as a main component may further contain any appropriate additive. Specific examples of the additive include a plasticizer, a thermal stabilizer, a light stabilizer, a lubricant, an antioxidant, a UV absorber, a flame retardant, a colorant, an antistatic agent, a compatibilizing agent, a crosslinking agent, and, a thickener. The kind and amount of the additive used may be appropriately set depending on the purpose. For example, a content of the additive is preferably 10 (weight ratio) or less, more preferably 5 (weight ratio) or less, and most preferably 3 (weight ratio) or less with respect to a total solid content in the polymer film as 100.

In one embodiment of the present invention, a retardation film used for the first optical element is a stretched film. For example, the retardation film used for the first optical element may be formed of a stretched film of the polymer film containing a cellulose ester as a main component. In the specification of the present invention, the term "stretched film" refers to a plastic film having enhanced alignment of molecules in a specific direction obtained by: applying tension to an unstretched film at an appropriate temperature; or applying tension to a film stretched in advance.

Any appropriate stretching method may be employed as a method of forming the stretched film. Specific examples of the stretching method include: a vertical uniaxial stretching method; a transverse uniaxial stretching method; a vertical and transverse simultaneous biaxial stretching method; and a vertical and transverse sequential biaxial stretching method. Any appropriate stretching machine such as a roll stretching machine, a tenter stretching machine, or a biaxial stretching machine maybe used as stretching means. In heat stretching, a stretching temperature may be continuously changed or may be changed in steps. The stretching may be performed in two or more steps.

In addition to the polymer films described above, a commercially available optical film as it is may be used as a polymer film containing the thermoplastic resin as a main component. A commercially available optical film may be subjected to fabrication such as stretching treatment and/or relaxation treatment before use. Specific examples of a commercially available polymer film containing a cellulose ester as a main component include "FUJITAC series" (TD, UZ, etc., trade name, available from Fuji Photo Film Co., Ltd.).

E. Second Optical Element

Referring to FIGS. 1, 2A, and 2B, the second optical element 40 is arranged between the first optical element 30 and the liquid crystal cell 10. The second optical element 40 satisfies the following expressions (1) and (2).

$$130 \text{ nm} \leq Re[590] \leq 250 \text{ nm} \quad (1)$$

$$0 \text{ nm} < Rth[590] < Re[590] \quad (2)$$

In the present invention, the second optical element is used in combination with the first optical element for reducing light leak in an oblique direction of the liquid crystal panel. In general, in a liquid crystal panel having two polarizers arranged on both sides of a liquid crystal cell such that respective absorption axes are perpendicular to each other, light hardly leaks in a normal direction but light leaks in an oblique direction. In a case where the absorption axes of the polarizers are arranged at 0° and 90°, respectively, an amount of light leak tends to maximize in an oblique direction at 45°. An amount of such light leak is reduced, to thereby increase a contrast ratio in an oblique direction and reduce a color shift in an oblique direction.

E-1. Optical Properties of Second Optical Element

The second optical element used in the present invention has Re[590] of 130 nm to 250 nm, and preferably 150 nm to 220 nm. Any appropriate Re[590] value may be selected within the above ranges in accordance with the Rth[590] value of the first optical element. To be specific, in a case where the first optical element has Rth[590] of 40 nm, the second optical element has Re[590] of preferably 150 nm to 250 nm, more preferably 170 nm to 220 nm, and most preferably 190 nm to 210 nm. Further, in a case where the first optical element has Rth[590] of 60 nm, the second optical element has Re[590] of preferably 130 nm to 230 nm, more preferably 150 nm to 210 nm, and most preferably 170 nm to 190 nm.

In general, retardation values of an optical element (or a retardation film) may vary depending on wavelength. This phenomenon is referred to as wavelength dispersion property of the optical element (or the retardation film). In the specification of the present invention, the wavelength dispersion property can be determined as a ratio Re[480]/Re[590] of in-plane retardation values determined by using light of a wavelength of 480 nm and light of a wavelength of 590 nm at 23° C.

The second optical element used in the present invention has Re[480]/Re[590] of preferably 0.8 to 1.2, more preferably 0.8 to 1.1, and particularly preferably 0.8 to 1.05. Smaller Re[480]/Re[590] within the above ranges provides uniform retardation values in, a wide visible light region. As a result, in a liquid crystal display apparatus employing the second optical element, light of wide range of wavelength leaks evenly and a color shift in an oblique direction of the liquid crystal display apparatus can be further reduced.

The second optical element used in the present invention has Rth[590] of preferably 30 nm to 130 nm, and more preferably 40 nm to 120 nm, within a range satisfying the expression 0<Rth[590]<Re[590]. Rth may be appropriately selected in view of a ratio (also referred to as an Nz coefficient) of a thickness direction retardation value (Rth [590]) and an in-plane retardation value (Re[590]) described below.

In the specification of the present invention, Rth[590]/Re [590] refers to a ratio (also referred to as an Nz coefficient) of a thickness direction retardation value (Rth[590]) and an in-plane retardation value (Re[590]) determined by using light of a wavelength of 590 nm at 23° C.

The second optical element has an Nz coefficient of preferably more than 0 and less than 1. An Nz coefficient of more than 0 and less than 1 allows appropriate adjustment in viewing angle dependency of retardation values and increase in contrast ratio in an oblique direction of the liquid crystal display apparatus. Thus, an optical element satisfying the expression 0 nm<Rth[590]<Re[590] is used as the second optical element. The second optical element has any appropriate Nz coefficient in accordance with the Rth[590] value of the first optical element, but is preferably 0.1 to 0.6, more preferably 0.2 to 0.5, and most preferably 0.25 to 0.45. To be specific, in a case where the first optical element has Rth[590] of 40 nm, the second optical element to be preferably used has an Nz coefficient of substantially 0.4. Further, in a case where the first optical element has Rth [590] of 60 nm, the second optical element to be preferably used has an Nz coefficient of substantially 0.3. In the specification of the present invention, the phrase "substantially 0.4" includes a case where the Nz coefficient is 0.4±0.05, preferably 0.4±0.03, and most preferably 0.4±0.02. Further, the phrase "substantially 0.3" includes a case where the Nz coefficient is 0.3±0.05, preferably 0.3±0.03, and most preferably 0.3±0.02.

E-2. Means for Arranging Second Optical Element

Referring to FIGS. 1, 2A, and 2B, any appropriate method may be used as a method of arranging the second optical element 40 between the first optical element 30 and the liquid crystal cell 10 depending on the purpose. Preferably, the second optical element 40 is provided with an adhesive layer or a pressure sensitive adhesive layer on each side, and is attached to the first optical element 30 and the liquid crystal cell 10. A gap between the optical elements is filled with the adhesive layer or the pressure sensitive adhesive layer, to thereby prevent shift in relationship among optical axes of the respective optical elements and damages of the optical elements through abrasion on each other when the optical elements are incorporated into a liquid crystal display apparatus. Further, interface reflection between layers of optical elements may be reduced, and contrast ratios of a liquid crystal display apparatus employing the optical elements in a normal direction and an oblique direction may be increased.

The same thickness range of the adhesive layer or pressure sensitive adhesive layer and the same kind of adhesive or pressure sensitive adhesive for forming the adhesive layer or pressure sensitive adhesive layer may be used as those described in the above-mentioned section D-2.

The second optical element 40 is preferably arranged such that its slow axis is substantially parallel or perpendicular to the absorption axis of the first polarizer 21. The second optical element 40 is most preferably arranged such that its slow axis is substantially perpendicular to the absorption axis of the first polarizer 21. Arrangement of the second optical element 40 such that its slow axis greatly departs from being perpendicular or parallel to the absorption axis of the first polarizer 21 tends to deteriorate contrast of a liquid crystal display apparatus employing the second optical element 40.

E-3. Structure of Second Optical Element

A structure (laminate structure) of the second optical element is not particularly limited as long as the second optical element satisfies the optical properties described in the above-mentioned section E-1. To be specific, the second optical element may be a single retardation film, or a laminate of two or more retardation films. The second optical element is preferably a single retardation film for reducing shift or unevenness in retardation values due to shrinkage stress of the polarizer or heat of backlight and for reducing a thickness of a liquid crystal panel. The second optical element as a laminate may include an adhesive layer or a pressure sensitive adhesive layer. In a case where the second optical element as a laminate includes two or more retardation films, the retardation films may be identical to or different from each other. Details of the retardation film will be described in the section E-4 below.

Re[590] of the retardation film used for the second optical element can be appropriately selected in accordance with the number of retardation films used. For example, in a case where the second optical element is formed of a single retardation film, Re[590] of the retardation film is preferably equal to Re[590] of the second optical element. Thus, a retardation value of a pressure sensitive adhesive layer, an adhesive layer, or the like used for lamination of the second optical element on the first polarizer or the liquid crystal cell is preferably as small as possible. Further, in a case where the second optical element is a laminate including two or more retardation films, for example, total Re[590] of the retardation films is preferably designed to be equal to Re[590] of the second optical element. To be specific, in a case where two retardation films are laminated such that respective slow axes are parallel to each other to form a second optical element having an Nz coefficient of 0.4 and Re[590] of 200 nm, retardation films each having an Nz coefficient of 0.4 and Re[590] of 100 nm are preferably used. The present specification describes the cases each employing two or less retardation films for simplicity, but the present invention may obviously be applied to a laminate including three or more retardation films.

A total thickness of the second optical element is preferably 20 µm to 400 µm, more preferably 30 µm to 300 µm, and particularly preferably 40 µm to 200 µm. The second optical element having a thickness within the above ranges may contribute to reduction in thickness of a liquid crystal display apparatus.

E-4. Retardation Film Used for Second Optical Element

The retardation film used for the second optical element is not particularly limited, but a retardation film preferably used has excellent transparency, mechanical strength, thermal stability, water barrier property, and the like, and hardly causes optical unevenness due to distortion.

The retardation film may have any appropriate thickness depending on the purpose. The thickness of the retardation film is preferably 20 µm to 200 µm, more preferably 30 µm to 180 µm, and particularly preferably 40 µm to 150 µm. A thickness of the retardation film within the above ranges can provide a retardation film with excellent mechanical strength and optical uniformity and satisfying the optical properties described in the above-mentioned section E-1.

An absolute value (C[590] (m$^2$/N)) of photoelastic coefficient of the retardation film determined as described above is preferably $1\times10^{-12}$ to $100\times10^{-12}$, more preferably $1\times10^{-12}$ to $60\times10^{-12}$, particularly preferably $1\times10^{-12}$ to $30\times10^{-12}$, and most preferably $1\times10^{-12}$ to $8\times10^{-12}$. A smaller absolute value of photoelastic coefficient within the above ranges hardly causes shift or unevenness in retardation values of the retardation film due to shrinkage stress of the polarizer or heat of backlight, to thereby provide a liquid crystal display apparatus employing the retardation film with excellent display uniformity.

The retardation film has a light transmittance of preferably 80% or more, more preferably 85% or more, and particularly preferably 90% or more measured by using light of a wavelength of 590 nm at 23° C. The second optical element preferably has a similar light transmittance.

The retardation film is preferably a stretched film of a polymer film containing the thermoplastic resin as a main component. Any appropriate thermoplastic polymer may be selected from those described in the above-mentioned section D-4.

The retardation film used for the second optical element is preferably a stretched film of a polymer film containing a norbornene-based resin. The norbornene-based resin is more liable to cause retardation through stretching than a polymer film containing other aliphatic resins as a main component, and has a smaller photoelastic coefficient than that of a polymer film containing as a main component an aromatic resin. As a result, a liquid crystal display apparatus exhibiting favorable optical properties and having little display unevenness can be obtained. Actual production of a retardation film having a relationship of nx>nz>ny and satisfying the above-mentioned expressions (1) and (2) by using a polymer film containing as a main component a cycloolefin-based resin obtained through hydrogenation of a ring-opened polymer of a norbornene-based monomer is one significant accomplishment of the present invention.

In the specification of the present invention, the norbornene-based resin refers to a (co)polymer obtained by using a norbornene-based monomer having a norbornene ring as a part or entire starting material (monomer). The norbornene-based resin is obtained by using as a starting material a norbornene-based monomer having a norbornene ring (having a double bond in a norbornane ring) However, the (co)polymer may or may not have a norbornane ring in a repeating unit. A norbornene-based resin as a (co)polymer having no norbornane ring is one obtained from a monomer forming a five-membered ring through ring opening, and typical examples of the monomer include norbornene, dicyclopentadiene, 5-phenylnorbornene, and derivatives thereof. In a case where the norbornene-based resin is a copolymer, an arrangement of its repeating units is not particularly limited. The norbornene-based resin may be a random copolymer, a block copolymer, or a graft copolymer.

Examples of the norbornene-based resin include: (A) a resin obtained through hydrogenation of a ring-opened (co)polymer of a norbornene-based monomer; and (B) a resin obtained through addition (co)polymerization of a norbornene-based monomer. The ring-opened (co)polymer of a norbornene-based monomer includes a resin obtained through hydrogenation of a ring-opened copolymer of one or more norbornene-based monomers, and α-olefins, cycloalkenes, and/or disconjugate dienes. The resin obtained through addition (co)polymerization of a norbornene-based monomer includes a resin obtained through addition (co)polymerization of one or more norbornene-based monomers, and α-olefins, cycloalkenes, and/or disconjugate dienes. The retardation film used for the second optical element preferably includes a resin obtained through hydrogenation of a ring-opened (co)polymer of a norbornene-based monomer, to thereby obtain a highly uniform retardation film having excellent moldability and large retardation values.

More preferably, the retardation film used in the present invention includes a resin obtained through hydrogenation of a ring-opened (co)polymer of a norbornene-based monomer and containing at least repeating units represented by the following general formulae (I), (II), and/or (III).

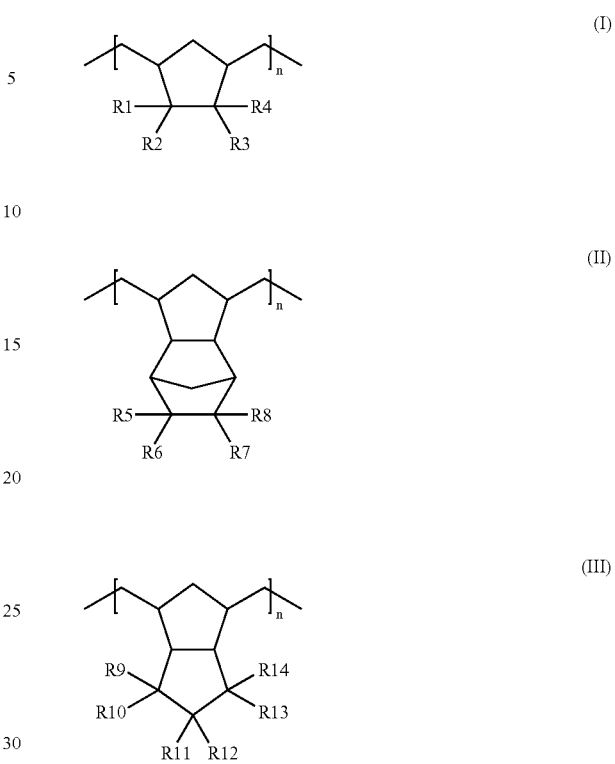

In the general formulae (I), (II), and (III), R1 to R14 each independently represent hydrogen, a halogen, a halogenated alkyl group, an alkyl group having 1 to 4 carbon atoms, an alkylidene group having 1 to 4 carbon atoms, an alkenyl group having 1 to 4 carbon atoms, an alkoxycarbonyl group having 1 to 4 carbon atoms, an aryl group, an aralkyl group, an aralkyloxy group, a hydroxyalkyl group, a cyano group, a cycloalkyl group having 4 to 10 carbon atoms, or an acyloxy group, or a substituted derivative thereof, and n represents an integer of 2 or more.

Particularly preferably, in the general formula (I), R1 to R4 each independently represent hydrogen, a halogen, a halogenated alkyl group, an alkyl group having 1 to 4 carbon atoms, an alkylidene group having 1 to 4 carbon atoms, an alkenyl group having 1 to 4 carbon atoms, an alkoxycarbonyl group having 1 to 4 carbon atoms, an aryl group, an aralkyl group, an aralkyloxy group, a cycloalkyl group having 4 to 10 carbon atoms, or an acyloxy group, and n represents an integer of 2 or more. In addition, in the general formula (II), R5 and R6 each independently represent hydrogen, a halogen, a halogenated alkyl group, an alkyl group having 1 to 4 carbon atoms, an alkylidene group having 1 to 4 carbon atoms, an alkenyl group having 1 to 4 carbon atoms, or an alkoxycarbonyl group having 1 to 4 carbon atoms, and n represents an integer of 2 or more. In addition, in the general formula (III), R9 to R14 each independently represent hydrogen or an alkyl group having 1 to 4 carbon atoms, and n represents an integer of 2 or more.

Most preferably, in the general formula (I), R1 and R2 each independently represent hydrogen, a trifluoromethyl group, a methyl group, an ethyl group, a methylidene group, an ethylidene group, a vinyl group, a propenyl group, a methoxycarbonyl group, an ethoxycarbonyl group, a phenyl group, an ethyl phenyl group, a benzoyloxy group, a cyclopentyl group, or a cyclohexyl group, R3 and R4 each represent hydrogen, and n represents an integer of 2 or more. In addition, in the general formula (II), R5 and R6 each independently represent hydrogen, a trifluoromethyl group, a methyl group, an ethyl group, a methylidene group, an ethylidene group, a vinyl group, a propenyl group, a methoxycarbonyl group, or an ethoxycarbonyl group, R7 and R8 each represent hydrogen, and n represents an integer of 2 or more. In addition, in the general formula (III), R9 to R12 each independently represent hydrogen or a methyl group, R13 and R14 each represent hydrogen, and n represents an integer of 2 or more.

Any appropriate monomers are selected as the norbornene-based monomer. For example, bicyclo[2.2.1]-hept-2-ene (common name: norbornene) and a derivative thereof can be used. Specific examples thereof include 5-methyl-bicyclo[2.2.1]-hept-2-ene,
5,5-dimethyl-bicyclo[2.2.1]-hept-2-ene,
5-ethyl-bicyclo[2.2.1]-hept-2-ene,
5-propyl-bicyclo[2.2.1]-hept-2-ene,
5-butyl-bicyclo[2.2.1]-hept-2-ene,
5-methylidene-bicyclo[2.2.1]-hept-2-ene,
5-ethylidene-bicyclo[2.2.1]-hept-2-ene,
5-vinyl-bicyclo[2.2.1]-hept-2-ene,
5-propenyl-bicyclo[2.2.1]-hept-2-ene,
5-methoxycarbonyl-bicyclo[2.2.1]-hept-2-ene,
5-ethoxycarbonyl-bicyclo[2.2.1]-hept-2-ene,
5-methyl-5-methoxycarbonyl-bicyclo[2.2.1]-hept-2-ene,
5-methyl-5-ethoxycarbonyl-bicyclo[2.2.1]-hept-2-ene,
5-phenyl-bicyclo[2.2.1]-hept-2-ene,
5-cyclopentyl-bicyclo[2.2.1]-hept-2-ene,
5-cyclohexyl-bicyclo[2.2.1]-hept-2-ene,
5-benzoyloxy-5-methylbicyclo[2.2.1]-hept-2-ene,
5-trifluoromethyl-bicyclo[2.2.1]-hept-2-ene,
5,6-bis(trifluoromethyl)-bicyclo[2.2.1]-hept-2-ene,
5-benzyl-bicyclo[2.2.1]-hept-2-ene,
5-tolyl-bicyclo[2.2.1]-hept-2-ene,
5-(ethylphenyl)-bicyclo[2.2.1]-hept-2-ene,
5-(isopropylphenyl)-bicyclo[2.2.1]-hept-2-ene,
5-cyano-bicyclo[2.2.1]-hept-2-ene,
bicyclo[2.2.1]-hept-5-enyl-2-propionate,
bicyclo[2.2.1]-hept-5-enyl-2-methyloctanoate,
bicyclo[2.2.1]-hept-5-ene-5,6-dicarboxylic anhydride, and
5-hydroxymethyl-bicyclo [2.2.1]-hept-5-ene, and polar group (such as halogen)-substituted products thereof.

Tricyclo[4.3.1$^{2,5}$.0$^{1,6}$]-deca-3,7-diene (common name: dicyclopentadiene) and a derivative thereof can also be used. Specific examples thereof include tricyclo[4.3.1$^{2,5}$.0$^{1,6}$]-deca-3-ene,
2-methyl-tricyclo[4.3.1$^{2,5}$.0$^{1,6}$]-deca-3-ene, and
5-methyl-tricyclo[4.3.1$^{2,5}$.0$^{1,6}$]-deca-3-ene, and polar group (such as halogen)-substituted products thereof.

Tricyclo[4.4.1$^{2,5}$.0$^{1,6}$]-undeca-3,7-diene,
tricyclo[4.4.1$^{2,5}$.0$^{1,6}$]-undeca-3,8-diene, and
tricyclo[4.4.1$^{2,5}$.0$^{1,6}$]-undeca-3-ene, and derivatives (such as polar group (such as halogen)-substituted products) thereof can be used.

Tetracyclo[4.4.1$^{2,5}$.1$^{7,10}$.0]-dodeca-3-ene (common name: tetracyclododecene) and a derivative thereof can also be used. Specific examples thereof include
8-methyl-tetracyclo[4.4.1$^{2,5}$.1$^{7,10}$.0]-dodeca-3-ene,
8-ethyl-tetracyclo[4.4.1$^{2,5}$.1$^{7,10}$.0]-dodeca-3-ene,
8-methylidene-tetracyclo[4.4.1$^{2,5}$.1$^{7,10}$.0]-dodeca-3-ene,
8-ethylidene-tetracyclo[4.4.1$^{2,5}$.1$^{7,10}$.0]-dodeca-3-ene,
8-vinyl-tetracyclo[4.4.1$^{2,5}$.1$^{7,10}$.0]-dodeca-3-ene,
8-propenyl-tetracyclo[4.4.1$^{2,5}$.1$^{7,10}$.0]-dodeca-3-ene,
8-methoxycarbonyl-tetracyclo[4.4.1$^{2,5}$.1$^{7,10}$.0]-dodeca-3-ene,
8-ethoxycarbonyl-tetracyclo[4.4.1$^{2,5}$.1$^{7,10}$.0]-dodeca-3-ene,
8-n-propoxycarbonyl-tetracyclo[4.4.1$^{2,5}$.1$^{7,10}$.0]-dodeca-3-ene,
8-butoxycarbonyl-tetracyclo[4.4.1$^{2,5}$.1$^{7,10}$.0]-dodeca-3-ene,
8-phenoxycarbonyl-tetracyclo[4.4.1$^{2,5}$.1$^{7,10}$.0]-dodeca-3-ene,
8-trifluoromethyl-tetracyclo[4.4.1$^{2,5}$.1$^{7,10}$.0]-dodeca-3-ene,
8-methyl-8-trifluoromethyl-tetracyclo[4.4.1$^{2,5}$.1$^{7,10}$.0]-dodeca-3-ene,
8-methyl-8-methoxycarbonyl-tetracyclo[4.4.1$^{2,5}$.1$^{7,10}$.0]-dodeca-3-ene,
8-methyl-8-ethoxycarbonyl-tetracyclo[4.4.1$^{2,5}$.1$^{7,10}$.0]-dodeca-3-ene,
8-methyl-8-n-propoxycarbonyl-tetracyclo[4.4.1$^{2,5}$.1$^{7,10}$.0]-dodeca-3-ene,
8-methyl-8-butoxycarbonyl-tetracyclo[4.4.1$^{2,5}$.1$^{7,10}$.0]-dodeca-3-ene, and
8-methyl-8-phenoxycarbonyl-tetracyclo[4.4.1$^{2,5}$.1$^{7,10}$.0]-dodeca-3-ene, and polar group (such as halogen)-substituted products thereof. The norbornene-based monomers may be used alone or in combination. The norbornene-based monomer may be used after having been subjected to any appropriate modification.

The norbornene-based monomer is preferably
5-methyl-bicyclo[2.2.1]-hept-2-ene,
5-methyl-bicyclo[2.2.1]-hept-2-ene,
5-methoxycarbonyl-bicyclo[2.2.1]-hept-2-ene,
5-methyl-5-methoxycarbonyl-bicyclo[2.2.1]-hept-2-ene,
5-phenyl-bicyclo[2.2.1]-hept-2-ene,
tricyclo[4.3.1$^{2,5}$.0$^{1,6}$]-deca-3,7-diene,
tricyclo[4.3.1$^{2,5}$.0$^{1,6}$]-deca-3-ene,
tetracyclo[4.4.1$^{2,5}$.1$^{7,10}$.0]-dodeca-3-ene,
8-methyl-tetracyclo[4.4.1$^{2,5}$.1$^{7,10}$.0]-dodeca-3-ene,
8-methoxycarbonyl-tetracyclo[4.4.1$^{2,5}$.1$^{7,10}$.0]-dodeca-3-ene, or
8-methyl-8-methoxycarbonyl-tetracyclo[4.4.1$^{2,5}$.1$^{7,10}$.0]-dodeca-3-ene, or a combination thereof.

The α-olefins has preferably 2 to 20 carbon atoms, or more preferably 2 to 10 carbon atoms. Specific examples of the α-olefins include ethylene, propylene, 1-butene, 3-methyl-1-butene, 1-pentene, 3-methyl-1-pentene, 4-methyl-1-pentene, 4,4-dimethyl-1-pentene, 1-hexene, 3-methyl-1-hexene, 4,4-dimethyl-1-hexene, 4-ethyl-1-hexene, 3-ethyl-1-hexene, 1-octene, 1-decene, 1-dodecene, 1-tetradecene, 1-hexadecene, and 1-eicosene. Of those, ethylene is particularly preferred. Those α-olefins may be used alone or in combination. The α-olefins may be copolymerized with other vinyl-based monomers as required unless an effect of the present invention is impaired.

Examples of the cycloalkenes include cyclobutene, cyclopentene, cyclohexene, 3-methyl-cyclohexene, 3,4-dimethyl-cyclohexene, 2-(2-methylbutyl)-1-cyclohexene, cycloheptene, cyclooctene, 6-bromo-3-chloro-4-methylcyclohexene, 3a,5,6,7a-tetrahydro-4,7-methano-1H-indene, and 5,6-dihydrodicyclopentadiene. Those cycloalkenes may be used alone or in combination. Those cycloalkenes may be copolymerized with other vinyl-based monomers as required unless the effect of the present invention is impaired.

Examples of the disconjugate diene include 1,4-hexadiene, 4-methyl-1,4-hexadiene, 5-methyl-1,4-hexadiene, and 1,7-octadiene. Those disconjugate dienes may be used alone or in combination. Those disconjugate dienes may be copolymerized with other vinyl-based monomers as required unless the effect of the present invention is impaired.

The resin obtained through hydrogenation of the ring-opened (co)polymer of a norbornene-based monomer can be obtained by: subjecting the norbornene-based monomer or the like to a metathesis reaction to obtain a ring-opened (co)polymer; and subjecting the ring-opened (co)polymer to hydrogenation. The resin is produced through, for example: a method described in "Development and applied techniques of optical polymer materials", published by NTS Inc., p. 103 to p. 111 (2003); a method described in paragraphs [0059] and [0060] of JP 11-116780 A; a method described in paragraphs [0035] to [0037] of JP 2001-350017 A; and a method described in paragraph [0053] of JP 2005-008698 A.

Examples of a catalyst for ring opening polymerization used in metathesis reaction include: a halide of a metal such as ruthenium, rhodium, palladium, osmium, iridium, or platinum; a polymerization catalyst composed of a nitrate or acetylacetone compound, and a reducing agent; and a polymerization catalyst composed of a halide of a metal such as titanium, vanadium, zirconium, tungsten, or molybdenum, or acetylacetone compound, and an organic aluminum compound. Reaction conditions such as polymerization temperature and polymerization pressure may be appropriately selected in accordance with the type of norbornene-based monomer, intended molecular weight, and the like. In one embodiment of the present invention, a polymerization temperature is preferably −50° C. to 100° C., and a polymerization pressure is preferably 0 to 50 kgf/cm$^2$.

Each of the resins obtained by hydrogenating ring-opened (co)polymers of the norbornene-based monomers can be obtained through a hydrogenation reaction performed by blowing hydrogen in the presence of any appropriate hydrogenation catalysts. Specific examples of the hydrogenation catalyst include: a homogenous catalyst composed of a transition metal compound/an alkyl metal compound such as cobalt acetate/triethyl aluminum, nickel acetylacetonate/triisobutyl aluminum, titanocene dichloride/n-butyllithium, zirconocene dichloride/sec-butyllithium, or tetrabutoxy titanate/dimethyl magnesium; a heterogeneous metal catalyst such as nickel, palladium, or platinum; and a heterogeneous solid-carrying catalyst wherein a metal catalyst is carried on a carrier, such as nickel/silica, nickel/diatomaceous earth, nickel/alumina, palladium/carbon, palladium/silica, palladium/diatomaceous earth, or palladium/alumina.

The resin obtained through addition (co)polymerization of a norbornene-based monomer can be obtained through a method described in Example 1 of JP 61-292601 A.

The norbornene-based resin used in the present invention has a weight average molecular weight (Mw) of preferably 20,000 to 400,000, more preferably 30,000 to 300,000, particularly preferably 40,000 to 200,000, and most preferably 40,000 to 80,000, measured through a gel permeation chromatograph (GPC) method by using a toluene solvent. The norbornene-based resin having a weight average molecular weight within the above ranges has excellent mechanical strength, and favorable solubility, moldability, and operability in casting.

In a case where the norbornene-based resin is obtained through hydrogenation of the ring-opened (co)polymer of a norbornene-based monomers a hydrogenation rate is preferably 90% or more, more preferably 95% or more, and most preferably 99% or more. The norbornene-based resin obtained at hydrogenation rate within the above ranges has excellent heat resistance and excellent light resistance. The hydrogenation rate can be obtained by: subjecting the norbornene-based resin to $^1$H-NMR (500 MHz) measurement; and determining the hydrogenation rate from an integrated intensity ratio of paraffin-based hydrogen atoms to olefin-based hydrogen atoms.

The retardation film used for the second optical element may include two or more types of norbornene-based resins. The retardation film may include another thermoplastic resin in addition to the norbornene-based resin. A content (weight ratio) of the other thermoplastic resin is preferably more than 0 and 50 or less, and more preferably more than 0 and 40 or less with respect to a total solid content of the retardation film as 100. The content of the other thermoplastic resin within the above ranges can provide a retardation film having a small photoelastic coefficient, favorable wavelength dispersion properties, and excellent durability, mechanical strength, and transparency.

Any appropriate one is selected as the thermoplastic resin depending on purposes. Specific examples thereof include: general-purpose plastics such as a polyolefin resin, a polyvinyl chloride-basedresin, a cellulose-basedresin, a styrene-basedresin, an acrylonitrile/butadiene/styrene-based resin, an acrylonitrile/styrene-based resin, polymethyl methacrylate, polyvinyl acetate, and a polyvinylidene chloride-based resin; general-purpose engineering plastics such as a polyamide-based resin, a polyacetal-based resin, a polycarbonate-based resin, a modified polyphenylene ether-based resin, a polybutylene terephthalate-based resin, and a polyethylene terephthalate-based resin; and super engineering plastics such as a polyphenylene sulfide-based resin, a polysulfone-based resin, a polyether sulfone-based resin, a polyether ether ketone-based resin, a polyarylate-based resin, a liquid crystalline resin, a polyamide-imide-based resin, a polyimide-based resin, and a polytetrafluoroethylene-based resin. Those thermoplastic resins may be used alone or in combination. Those thermoplastic resins may be used after having been subjected to any appropriate polymer modification. Examples of the polymer modification include copolymerization, cross-linking, a molecular terminal modification, and stereoregularity modification.

In a case where the retardation film used for the second optical element is a stretched polymer film containing the norbornene-based resin and another thermoplastic resin, the other thermoplastic resin is preferably a styrene-based resin. The styrene-based resin is used for adjusting the wavelength dispersion properties or photoelastic coefficient of the retardation film. In the specification of the present invention, the term "styrene-based resin" refers to a polymer obtained by polymerizing a styrene-based monomer. Examples of the styrene-based monomer include styrene, α-methylstyrene, o-methylstyrene, p-methylstyrene, p-chlorostyrene, p-nitrostyrene, p-aminostyrene, p-carboxystyrene, p-phenylstyrene, and 2,5-dichlorostyrene.

The styrene-based resin may be a copolymer obtained through a reaction of the styrene-based monomer and another monomer. Specific examples of the copolymer include a styrene/maleimide copolymer, a styrene/maleic anhydride copolymer, and a styrene/methyl methacrylate copolymer. In a case where the styrene-based resin is a copolymer obtained through a reaction of the styrene-based monomer and another monomer, a content of the styrene-based monomer is preferably 50 mol % or more and less than 100 mol %, more preferably 60 mol % or more and less than 100 mol %, and most preferably 70 mol % or more and less than 100 mol %. The content of the styrene-based monomer within the above ranges can provide a retardation film having a small photoelastic coefficient and excellent wavelength dispersion properties.

The styrene-based resin has a weight average molecular weight (Mw) of preferably 1,000 to 400,000, and more preferably 2,000 to 300,000, measured through a gel permeation chromatograph (GPC) method by using a tetrahydrofuran solvent. The styrene-based resin having a weight average molecular weight within the above ranges has favorable solubility or moldability.

The same method as the forming method described in the above-mentioned section D-4 may be employed as a method of obtaining a polymer film containing the thermoplastic resin as a main component. Of those, extrusion is preferred because a highly smooth retardation film with small Re[590] and Rth[590] and favorable optical uniformity can be obtained. To be specific, the extrusion involves: melting a resin composition containing a thermoplastic resin as a main component, a plasticizer, an additive, and the like under heating; extruding the melted resin composition into a thin film on a surface of a casting roll by using a T-die or the like; and cooling the whole to produce a film.

The conditions for forming a polymer film containing the thermoplastic resin as a main component may be appropriately selected in accordance with the composition or kind of the resin, the forming method, and the like. In extrusion, a T-die is preferably used at a resin temperature of 240° C. to 300° C. and a take-up roll (cooling drum) temperature of 100° C. to 150° C. Further, conditions for slow cooling are preferably selected.

In addition to the polymer films described above, a commercially available optical film as it is may be used as a polymer film containing the thermoplastic resin as a main component. A commercially available optical film may be subjected to fabrication such as stretching treatment and/or relaxation treatment before use. Specific examples of a commercially available polymer film containing as a main component a cycloolefin-based resin obtained through hydrogenation of a ring-opened polymer of a norbornene-based monomer include: "ZEONEX series" (480, 480R, etc., trade name, available from Zeon Corporation); "ZEONOR series" (ZF14, ZF16, etc., trade name, available from Zeon Corporation); and "ARTON series" (ARTONG, ARTONF, etc., trade name, available from JSR Corporation).

The retardation film used for the second optical element may be obtained by, for example: attaching shrinkable films on both sides of a polymer film containing a thermoplastic resin as a main component; and heat stretching the resultant through a vertical uniaxial stretching method by using a roll stretching machine. The shrinkable film is used for providing shrinkage force in a direction perpendicular to a stretching direction during heat stretching, and for increasing a refractive index (nz) in a thickness direction. A method of attaching the shrinkable films to both sides of the polymer film is not particularly limited. However, a preferred method thereof involves bonding the polymer film and the shrinkable film by providing an acrylic pressure sensitive adhesive layer containing an acrylic polymer as a base polymer therebetween from the viewpoints of excellent workability and economical efficiency.

Figure 4:
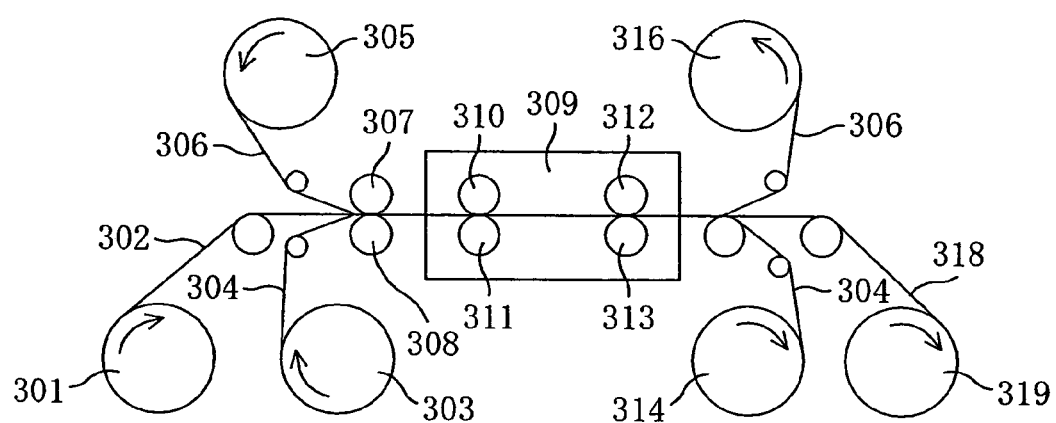
FIG. 4 is a schematic diagram showing a concept of a typical production process of a retardation film used for a second optical element.

An example of a method of producing the retardation film used for the second optical element will be described with reference to FIG. 4. FIG. 4 is a schematic diagram showing a concept of a typical production process of the retardation film used for the second optical element. For example, a polymer film 302 containing as a main component a cycloolefin-based resin obtained through hydrogenation of a ring-opened polymer of a norbornene-based monomer is delivered from a first delivery part 301. A shrinkable film 304 provided with a pressure sensitive adhesive layer and delivered from a second delivery part 303, and a shrinkable film 306 provided with a pressure sensitive adhesive layer and delivered from a third delivery part 305 are attached to both sides of the polymer film 302 by laminate rollers 307 and 308. The polymer film having the shrinkable films attached to both sides is subjected to stretching treatment while being maintained at a constant temperature by drying means 309 under tension in a longitudinal direction of the film by rollers 310, 311, 312, and 313 at different speed ratios (under tension in a thickness direction by the shrinkable films at the same time). The shrinkable films 304 and 306 together with the pressure sensitive adhesive layers are peeled off from a stretched film 318 at a first take-up part 314 and a second take-up part 316, and the stretched film 318 is taken-up at a third take-up part 319.

In one embodiment of the present invention, the shrinkable film has a shrinkage ratio in a longitudinal direction of the film $S^{140}(MD)$ of preferably 2.7 to 9.4%, and a shrinkage ratio in a width direction of the film $S^{140}(TD)$ of preferably 4.6 to 20% at 140° C. More preferably, $S^{140}(MD)$ is 6.0 to 8.0% and $S^{140}(TD)$ is 10 to 15.8%. In another embodiment of the present invention, the shrinkable film has a shrinkage ratio in a longitudinal direction of the film $S^{160}(MD)$ of preferably 17 to 21%, and a shrinkage ratio in a width direction of the film $S^{160}(TD)$ of preferably 40 to 52% at 160° C. Shrinkage ratios within the above ranges can provide intended retardation values and a retardation film having excellent uniformity.

In one embodiment of the present invention, a difference $\Delta S^{140} = S^{140}(TD) - S^{140}(MD)$ between the shrinkage ratio in a width direction of the film $S^{140}(TD)$ and the shrinkage ratio in a longitudinal direction of the film $S^{140}(MD)$ falls within a range of preferably $3.2\% \leq \Delta S^{140} \leq 10\%$, more preferably $6\% \leq \Delta S^{140} \leq 9.6\%$ at 140° C. In another embodiment of the present invention, a difference $\Delta S^{160} = S^{160}(TD) - S^{160}(MD)$ between the shrinkage ratio in a width direction of the film $S^{160}(TD)$ and the shrinkage ratio in a longitudinal direction of the film $S^{140}(MD)$ falls within a range of preferably $25\% \leq \Delta S^{160} \leq 35\%$ at 160° C. A large shrinkage ratio in an MD direction may cause difficulties in uniform stretching due to shrinkage force of the retardation film on a stretching machine, in addition to stretching tension. A difference within the above ranges allows uniform stretching without applying excess load to facilities such as a stretching machine.

The shrinkable film preferably has a shrinkage stress per 2 mm in a width direction $T_A^{140}(TD)$ of 0.5 to 0.9 N/2 mm at 140° C. The shrinkable film preferably has a shrinkage stress per unit area in a width direction $T_B^{140}(TD)$ of 8.3 to 15.0 N/mm$^2$ at 140° C. A shrinkage stress within the above ranges can provide intended retardation values and allows uniform stretching.

The shrinkable film preferably has a shrinkage stress per 2 mm in a width direction $T_A^{150}(TD)$ of 0.6 to 1.0 N/2 mm at 150° C. The shrinkable film preferably has a shrinkage stress per unit area in a width direction $T_B^{150}(TD)$ of 10 to 16.7 N/mm$^2$ at 150° C. A shrinkage stress within the above ranges can provide intended retardation values and allows uniform stretching.

The shrinkage ratios S(MD) and S(TD) can be determined in accordance with a heat shrinkage ratio A method of JIS Z1712-1997 (except that: a heating temperature is changed from 120° C. to 140° C. or 160° C. as described above; and a load of 3 g is added to a sample piece). To be specific, five samples having a width of 20 mm and a length of 150 mm are sampled from a longitudinal direction (machine direction MD) and a width direction (transverse direction TD), respectively. The sample pieces are each marked at a distance of about 100 mm at a center. The sample pieces each with a load of 3 g are hung vertically into an air-circulating thermostatic bath maintained at 140° C.±3° C. or 160° C.±3°

C. The sample pieces are heated for 15 min, taken out of the thermostatic bath, and left standing under standard conditions (room temperature) for 30 min. Then, the distances between marks are measured by using a caliper in accordance with JIS B7507, to thereby obtain an average of five measured values. A shrinkage ratio can be calculated from an equation S(%)=[(distance between marks (mm) before heating−distance between marks (mm) after heating)/distance between marks (mm) before heating]×100.

The shrinkable film is preferably a stretched film such as a biaxially stretched film or a uniaxially stretched film. The shrinkable film can be obtained by: forming an unstretched film through an extrusion method; and stretching the unstretched film in a machine and/or transverse direction at a predetermined stretch ratio by using a simultaneous biaxial stretching machine or the like. The forming and stretching conditions may be appropriately selected in accordance with the purpose, compositions or kinds of resins to be used, and the like.

Examples of a material used for the shrinkable film include polyester, polystyrene, polyethylene, polypropylene, polyvinyl chloride, and polyvinylidene chloride. A biaxially stretched polypropylene film is preferably used from the viewpoints of excellent shrinkage uniformity and thermal resistance.

A commercially available shrinkable film used for applications such as general packaging, food packing, pallet wrapping, shrinkable labels, cap seals, and electrical insulation can be appropriately selected and used as the above-described shrinkable film as long as the purpose of the present invention can be satisfied. The commercially available shrinkable film may be used as it is, or may be used after the shrinkable film is subjected to fabrication such as stretching treatment or shrinking treatment. Specific examples of the commercially available shrinkable film include: "ALPHAN" (trade name, available from Oji paper Co., Ltd.); "FANCYTOP series" (trade name, available from Gunze Ltd.); "TORAYFAN series" (trade name, available from Toray Industries, Inc.); "SUN.TOX-OP series" (trade name, available from SUN.TOX Co., Ltd.); and "TOHCELLO OP series" (trade name, available from TOHCELLO Co., Ltd.).

A temperature inside a stretching oven (also referred to as stretching temperature) during heat stretching of a laminate of the polymer film containing a thermoplastic resin as a main component, and the shrinkable film may be appropriately selected in accordance with the intended retardation values, the kind or thickness of the polymer film used, and the like. The stretching is preferably performed at Tg+1° C. to Tg+30° C. (where, Tg represents a glass transition temperature of the polymer film) because retardation values easily even out and the film hardly crystallizes (becomes clouded) within the above-mentioned temperature range. More specifically, the stretching temperature is preferably 110° C. to 185° C., more preferably 120° C. to 170° C., and most preferably 130° C. to 160° C. The glass transition temperature (Tg) can be determined through a method in accordance with JIS K7121-1987 by differential scanning calorimetry (DSC) measurement.

A stretching ratio (stretch ratio) during stretching of a laminate of the polymer film containing a thermoplastic resin as a main component, and the shrinkable film may be appropriately selected in accordance with the intended retardation values, the kind or thickness of the polymer film used, and the like. To be specific, the stretch ratio is preferably 1.05 times to 1.7 times, and more preferably 1.05 times to 1.50 times. A delivery speed during stretching is not particularly limited, but is preferably 0.5 m/min to 30 m/min, and more preferably 1 m/min to 20 m/min in consideration of the machine accuracy, stability, and the like of the stretching machine. The above-mentioned stretching conditions can provide a retardation film not only satisfying the optical properties described in the above-mentioned section E-1 but also having excellent optical uniformity.

F. Third Optical Element

Referring to FIGS. 1, 2A, and 2B, the third optical element 50 is arranged between the liquid crystal cell 10 and the second polarizer 22. In the liquid crystal panel of O-mode as shown in FIG. 2A, the third optical element 50 may be arranged between the liquid crystal cell 10 and the second polarizer 22 arranged on a backlight side of the liquid crystal cell. In the liquid crystal panel of E-mode as shown in FIG. 2B, the third optical element 50 may be arranged between the liquid crystal cell 10 and the second polarizer 22 arranged on a viewer side of the liquid crystal cell. In this way, the third optical element serves as a protective layer on a cell side of the polarizer and prevents deterioration of the polarizer, to thereby maintain high display properties of the liquid crystal display apparatus for a long period of time. The third optical element 50 has substantially optical isotropy. In the specification of the present invention, the phrase "having substantially optical isotropy" refers to "having a refractive index profile satisfying the expression nx=ny=nz", (where, nx and ny represent main in-plane refractive indices and nz represents a thickness direction refractive index). The specification of the present invention includes not only a case where nx, ny, and nz are completely identical, but also a case where nx, ny, and nz are substantially identical (nx≈ny≈nz). The phrase "a case where nx, ny, and nz are substantially identical" as used herein includes a case where an in-plane retardation value (Re[590]) is 10 nm or less and an absolute value of a thickness direction retardation value (Rth[590]) is 10 nm or less, for example.

In the present invention, the third optical element is used for eliminating adverse effects on display properties of the liquid crystal display apparatus. In general, a liquid crystal layer (eventually, a liquid crystal cell) containing homogeneously aligned liquid crystal molecules has retardation corresponding to a product of a cell gap and a birefringence of the liquid crystal layer. The retardation of the liquid crystal layer may act synergistically with the retardation of the third optical element to adversely affect the display properties of the liquid crystal display apparatus. To be specific, in a case where an absolute value of a thickness direction retardation value of the third optical element exceeds 10 nm, light leaks from the liquid crystal display apparatus, which tends to have a reduced contrast ratio in an oblique direction and an increased color shift in an oblique direction. The in-plane and thickness direction retardation values of the third optical element are reduced, to thereby eliminate adverse effects of the retardation of the liquid crystal layer on the display properties of the liquid crystal display apparatus. As a result, a liquid crystal display apparatus exhibiting sufficient optical compensation owing to combination of the first optical element and the second optical element and having favorable display properties can be obtained.

F-1. Optical Properties of Third Optical Element

Re[590] of the third optical element used in the present invention is preferably as small as possible. Re[590] is preferably 5 nm or less, and more preferably 3 nm or less. Re[590] within the above ranges can increase a contrast ratio in an oblique direction of the liquid crystal display apparatus and reduce a color shift in an oblique direction thereof.

Rth[590] of the third optical element is preferably as small as possible. An absolute value of Rth[590] is preferably 7 nm or less, and more preferably 5 nm or less. Rth[590] within the above ranges can eliminate adverse effects of Rth on display properties of the liquid crystal display apparatus, increase a contrast ratio in an oblique direction of the liquid crystal display apparatus, and reduce a color shift in an oblique direction thereof.

F-2. Means for Arranging Third Optical Element

Referring to FIGS. 1, 2A, and 2B, any appropriate method may be used as a method of arranging the third optical element 50 between the liquid crystal cell 10 and the second polarizer 22 depending on the purpose. Preferably, the third optical element 50 is provided with an adhesive layer or a pressure sensitive adhesive layer (not shown) on each side, and is attached to the liquid crystal cell 10 and the second polarizer 22. A gap between the optical elements is filled with the adhesive layer or the pressure sensitive adhesive layer, to thereby prevent shift in relationship among optical axes of the respective optical elements and damages of the optical elements through abrasion on each other when the optical elements are incorporated into a liquid crystal display apparatus. Further, interface reflection between layers of optical elements may be reduced, and contrast ratios of a liquid crystal display apparatus employing the optical elements in a normal direction and an oblique direction may be increased.

The same thickness range of the adhesive layer or pressure sensitive adhesive layer and the same kind of adhesive or pressure sensitive adhesive for forming the adhesive layer or pressure sensitive adhesive layer may be used as those described in the above-mentioned section D-2.

In a case where nx and ny of the third optical element 50 are completely identical, the third optical element 50 has no in-plane retardation and its slow axis is not detected. Thus, the third optical element 50 may be arranged independently from the absorption axis of the second polarizer 22. In a case where nx and ny of the third optical element 50 are substantially identical, but are slightly different, its slow axis may be detected. In this case, the third optical element 50 is preferably arranged such that its slow axis is substantially parallel or perpendicular to the absorption axis of the second polarizer 22. Arrangement of the third optical element 50 such that its slow axis greatly departs from being perpendicular or parallel to the absorption axis of the second polarizer 22 tends to deteriorate contrast of a liquid crystal display apparatus employing the third optical element 50.

F-3. Structure of Third Optical Element

A structure (laminate structure) of the third optical element is not particularly limited as long as the third optical element satisfies the optical properties described in the above-mentioned section F-1. The third optical element may be a single optical film, or a laminate of two or more optical films. The third optical element as a laminate may include an adhesive layer or a pressure sensitive adhesive layer for attaching the optical films. The optical film may be an isotropic film or a retardation film as long as the third optical element has substantially optical isotropy. In a case where the third optical element as a laminate includes two retardation films, the retardation films are preferably laminated such that the respective slow axes are perpendicular to each other, to thereby reduce in-plane retardation values. Further, the retardation films having opposite signs of thickness direction retardation values are preferably laminated, to thereby reduce thickness direction retardation values.

A total thickness of the third optical element is preferably 20 μm to 500 μm, more preferably 20 μm to 400 μm, and particularly preferably 20 μm to 200 μm. A thickness of the third optical element within the above ranges may contribute to reduction in thickness of a liquid crystal display apparatus.

F-4. Optical Film Used for Third Optical Element

The optical film used for the third optical element is preferably an isotropic film. In the specification of the present invention, the term "isotropic film" refers to a film having a small difference in optical properties in three-dimensional directions and having substantially no anisotropic optical properties such as birefringence. Note that the phrase "having substantially no anisotropic optical properties" indicates that isotropy includes a case where slight birefringence provides no adverse effects on display properties of a liquid crystal display apparatus in practical use. The isotropic film used for the third optical element is not particularly limited, but is preferably an isotropic film with excellent transparency, mechanical strength, thermal stability, water barrier property, and the like and hardly causing optical unevenness.

Any appropriate thickness of the isotropic film may be selected depending on the purpose or the laminate structure of the third optical element. The thickness of the isotropic film is preferably 20 μm to 200 μm, more preferably 20 μm to 180 μm, and particularly preferably 20 μm to 150 μm. A thickness of the isotropic film within the above ranges can provide an optical film having excellent mechanical strength and optical uniformity and satisfying the optical properties described in the above-mentioned section F-1.

An absolute value (C[590] (m$^2$/N)) of photoelastic coefficient of the isotropic film is preferably $1\times10^{-12}$ to $100\times10^{-12}$, more preferably $1\times10^{-12}$ to $50\times10^{-12}$, particularly preferably $1\times10^{-12}$ to $30\times10^{-12}$, and most preferably $1\times10^{-12}$ to $8\times10^{-12}$. A smaller absolute value of photoelastic coefficient within the above ranges hardly causes shift or unevenness in retardation values due to shrinkage stress of the polarizer or heat of backlight, to thereby provide a liquid crystal display apparatus with excellent optical uniformity.

The isotropic film has a light transmittance of preferably 80% or more, more preferably 85% or more, and particularly preferably 90% or more measured by using light of a wavelength of 590 nm at 23° C. The third optical element preferably has a similar light transmittance.

The isotropic film is preferably a stretched film of a polymer film containing a thermoplastic resin as a main component. Any appropriate thermoplastic resin may be selected from those described in the above-mentioned section D-4. However, the isotropic film used for the third optical element is preferably a polymer film containing as a main component at least one resin selected from a cellulose ester, a cycloolefin-based resin obtained through hydrogenation of a ring-opened polymer of a norbornene-based monomer, an addition copolymer of a norbornene-based monomer and an α-olefin monomer, and an addition copolymer of a maleimide-based monomer and an olefin monomer.

Any appropriate cellulose ester may be employed as the cellulose ester, and specific examples thereof include organic acid esters such as cellulose acetate, cellulose propionate, and cellulose butyrate. The cellulose ester may be a mixed organic acid ester in which hydroxyl groups of cellulose are substituted partly by an acetyl group and partly by a propionyl group, for example. A polymer film containing the cellulose ester as a main component and having small Re[590] and Rth[590] is preferably formed through casting. Re[590] and Rth[590] may be appropriately adjusted in accordance with the forming conditions, the film thickness, and the like. The film may be obtained through a method described in Example 1 of JP 07-112446 A, for example. A commercially available film may be swelled by a ketone-based solvent such as cyclopentanone then subjected to drying treatment, to thereby obtain a polymer film having small Rth[590].

Any appropriate cycloolefin-based resin obtained through hydrogenation of a ring-opened polymer of a norbornene-based monomer may be selected from those described in the above-mentioned section E-4. A polymer film containing as a main component the cycloolefin-based resin obtained through hydrogenation of a ring-opened polymer of a norbornene-based monomer and having small Re[590] and Rth[590] is preferably formed through extrusion. Re[590] and Rth[590] may be appropriately adjusted in accordance with the forming conditions, the film thickness, and the like. To be specific, the film may be obtained through a method described in Example 1 of JP 04-301415 A, for example.

The addition copolymer of a norbornene-based monomer and an α-olefin monomer may be obtained through a method described in Example 1 of JP 61-292601 A, for example. Examples of the norbornene-based monomer include those described in the above-mentioned section E-4. The α-olefin monomer preferably has 2 to 20 carbon atoms, and more preferably 2 to 10 carbon atoms. Examples thereof include ethylene, propylene, 1-butene, 3-methyl-1-butene, 1-pentene, 3-methyl-1-pentene, 4-methyl-1-pentene, 1-hexene, 1-octene, 1-decene, 1-dodecene, 1-tetradecene, 1-hexadecene, and 1-icosene. Of those, ethylene is particularly preferred. The α-olefin monomer may be used alone in combination. A vinyl-based monomer may be copolymerized as required without inhibiting the purpose of the present invention. A polymer film containing as a main component the addition copolymer of a norbornene-based monomer and an α-olefin monomer and having small Re[590] and Rth [590] is preferably formed through extrusion. Re[590] and Rth[590] may be appropriately adjusted in accordance with the forming conditions, the film thickness, and the like.

The addition copolymer of a maleimide-based monomer and an olefin monomer used for the isotropic film may be obtained through a method described in Example 1 of JP 05-59193 A, for example. Examples of the maleimide-based monomer include N-alkyl substituted maleimides such as N-methyl maleimide, N-ethyl maleimide, N-n-propyl maleimide, N-i-propyl maleimide, N-n-butyl maleimide, N-i-butyl maleimide, N-s-butyl maleimide, N-t-butyl maleimide, N-n-pentyl maleimide, N-n-hexyl maleimide, N-n-heptyl maleimide, N-n-octyl maleimide, N-lauryl maleimide, N-stearyl maleimide, N-cyclopropyl maleimide, N-cyclobutyl maleimide, and N-cyclohexyl maleimide. Of those, N-methyl maleimide, N-ethyl maleimide, N-i-propyl maleimide, or N-cyclohexyl maleimide is preferred. The maleimide-based monomer maybe used alone or in combination. Examples of the olefin monomer include isobutene, 2-methyl-1-butene, 2-methyl-1-pentene, 2-methyl-1-hexene, 1-methyl-1-heptene, 1-isooctene, 2-methyl-1-octene, 2-ethyl-1-pentene, 2-methyl-2-butene, 2-methyl-2-pentene, and 2-methyl-2-hexene. Of those, isobutene is preferred. The olefin monomer may be used alone or in combination. A vinyl-based monomer may be copolymerized as required without inhibiting the purpose of the present invention. A polymer film containing as a main component the addition copolymer of a maleimide-based monomer and an olefin monomer and having small Re[590] and Rth[590] is preferably formed through extrusion. Re[590] and Rth[590] may be appropriately adjusted in accordance with the forming conditions, the film thickness, and the like. The film may be obtained through a method described in Example 1 of JP 2004-45893 A, for example.

Examples of the isotropic film, in addition to the above-mentioned materials include: a polycarbonate-based resin having 9,9-bis(4-hydroxyphenyl)fluorene on a side chain, described in JP 2001-253960 A; a random copolymer of a monomer forming a polymer exhibiting positive birefringence and a monomer forming a polymer exhibiting negative birefringence, described in "Development and applied technology of optical polymer material" (p. 194 to p. 207, published by NTS Inc., 2003); and a polymer doped with anisotropic low molecular weight molecules or birefringent liquid crystals.

G. Liquid Crystal Display Apparatus

The liquid crystal panel of the present invention may be used for: a liquid crystal display apparatus such as a personal computer, a liquid crystal television, a cellular phone, or a personal digital assistance (PDA); or an image display apparatus such as an organic electroluminescence display (organic EL), a projector, a projection television, or a plasma television. In particular, the liquid crystal panel of the present invention is preferably used for a liquid crystal display apparatus, and particularly preferably used for a liquid crystal television.

Figure 5:
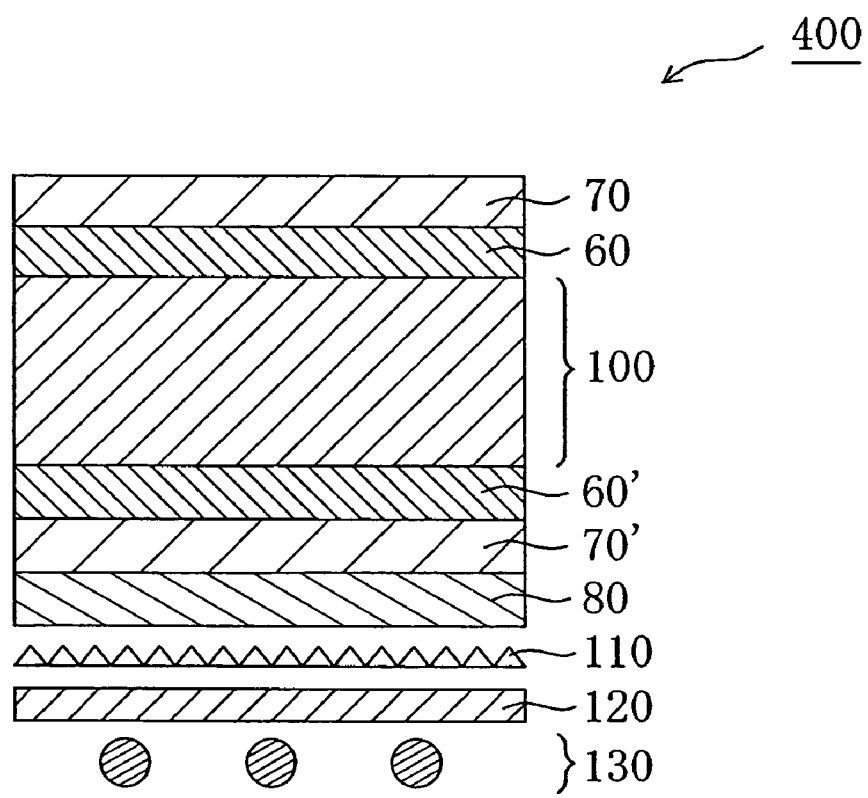
FIG. 5 is a schematic sectional view of a liquid crystal display apparatus according to a preferred embodiment of the present invention.

FIG. 5 is a schematic sectional view of a liquid crystal display apparatus according to a preferred embodiment of the present invention. Note that, ratios among length, width, and thickness of each member in FIG. 5 are different from those of an actual member for clarity. A liquid crystal display apparatus 400 is provided with: a liquid crystal panel 100; protective layers 60 and 60' arranged on both sides of the liquid crystal panel 100; surface treated layers 70 and 70' arranged on outer sides of the protective layers 60 and 60'; a brightness enhancement film 80 arranged on an outer side (backlight side) of the surface treated layer 70'; a prism sheet 110; a light guide plate 120; and backlight 130. Films subjected to the hard coat treatment, antireflection treatment, anti-sticking treatment, diffusion treatment (also referred to as anti-glare treatment), or the like is used as the surface treated layers 70 and 70'. A polarization separation film having a polarization selection layer "D-BEF series" (trade name, manufactured by Sumitomo 3M Limited, for example) or the like is used as the brightness enhancement film 80. The above-described optical members are used, to thereby obtain a display apparatus with better display properties. The optical members shown in FIG. 5 may be at least partly omitted or replaced by other members in accordance with the drive mode or application of the liquid crystal cell as long as the effects of the present invention are obtained.

A liquid crystal display apparatus provided with the liquid crystal panel of the present invention has a contrast ratio (YW/YB) of preferably 30 to 200, more preferably 40 to 200, and particularly preferably 50 to 200 in an azimuth angle of 45° and a polar angle of 60°.

A liquid crystal display apparatus provided with the liquid crystal panel of the present invention has a maximum contrast ratio of preferably 600 or more, more preferably 700 or more, and most preferably 800 or more at an azimuth angle of 45° and a polar angle of 0° to 78°. A liquid crystal display apparatus provided with the liquid crystal panel of the present invention has a minimum contrast ratio of preferably 60 or more, more preferably 70 or more, and most preferably 90 or more at an azimuth angle of 45° and a polar angle of 0° to 78°. A liquid crystal display apparatus provided with the liquid crystal panel of the present invention has an average contrast ratio of preferably 280 or more, more preferably 350 or more, and most preferably 400 or more at an azimuth angle of 45° and a polar angle of 0° to 78°.

A liquid crystal display apparatus provided with the liquid crystal panel of the present invention has a color shift (Δab value) of preferably 0.1 to 1.0, more preferably 0.1 to 0.8, and particularly preferably 0.1 to 0.5 at an azimuth angle of 45° and a polar angle of 60°.

In a case where a black image is displayed on a liquid crystal display apparatus provided with the liquid crystal panel of the present invention in a dark room at 23° C., a difference between maximum brightness and minimum brightness of the entire panel is preferably 1.28 or less, more preferably 1.12 or less, and particularly preferably 0.96 or less, as evaluation of display uniformity.

A liquid crystal display apparatus provided with the liquid crystal panel of the present invention has a maximum Δu'v' value of preferably 0.130 or less, more preferably 0.120 or less, particularly preferably 0.110 or less, and most preferably 0.100 or less in all azimuth directions (0° to 360°) at a polar angle of 60°, and an average Δu'v' value of preferably 0.080 or less, more preferably 0.070 or less, and most preferably 0.060 or less in all azimuth directions (0° to 360°) at a polar angle of 60°.

H. Application of Liquid Crystal Panel and Liquid Crystal Display Apparatus of the Present Invention The application of the liquid crystal panel and liquid crystal display apparatus of the present invention is not particularly limited, but the liquid crystal panel and liquid crystal display apparatus of the present invention may be used for various applications such as: office automation (OA) devices such as a personal computer monitor, a lap top personal computer, and a copying machine; portable devices such as a cellular phone, a watch, a digital camera, a personal digital assistance (PDA), and a portable game machine; home appliances such as a video camera, a liquid crystal television, and a microwave; in-car devices such as a back monitor, a car navigation system monitor, and a car audio; display devices such as a commercial information monitor; security devices such as a surveillance monitor; and nursing care and medical devices such as a nursing monitor and a medical monitor.

In particular, the liquid crystal panel and liquid crystal display apparatus of the present invention is preferably used for a large liquid crystal television. A liquid crystal television employing the liquid crystal panel and liquid crystal display apparatus of the present invention has a screen size of preferably wide 17-inch (373 mm×224 mm) or more, more preferably wide 23-inch (499 mm×300 mm) or more, particularly preferably wide 26-inch (566 mm×339 mm) or more, and most preferably wide 32-inch (687 mm×412 mm) or more.

The present invention will be described in more detail by using the following examples and comparative examples. The present invention is not limited to the examples. Analysis methods used in examples are described below.

(1) Method of Determining Single Axis Transmittance and Degree of Polarization:

The single axis transmittance and degree of polarization were determined at 23° C. by using a spectrophotometer "DOT-3" (trade name, manufactured by Murakami Color Research Laboratory).

(2) Method of Measuring Molecular Weight:

The molecular weight was calculated through a gel permeation chromatograph (GPC) method by using polystyrene as a standard sample. To be specific, the molecular weight was measured under the following measurement conditions by using the following apparatus and instruments.

Measurement sample: A sample resin was dissolved in tetrahydrofuran to prepare a 0.1 wt % solution which was left standing over night. Then, the solution was filtered through a 0.45 μm membrane filter to obtain a filtrate for measurement.

Analyzer: "HLC-8120GPC", manufactured by Tosoh Corporation

Column: TSKgel SuperHM-H/H4000/H3000/H2000

Column size: 6.0 mm I.D.×150 mm

Eluant: tetrahydrofuran

Flow rate: 0.6 ml/min

Detector: RI

Column temperature: 40° C.

Injection amount: 20 μl (3) Method of Measuring Thickness:

A thickness of less than 10 μm was measured by using a thin film thickness spectrophotometer "Multichannel photodetector (MCPD-2000)" (trade name, manufactured by Otsuka Electronics Co., Ltd.). A thickness of 10 μm or more was measured by using a digital micrometer "KC-351C-type" (trade name, manufactured by Anritsu Corporation).

(4) Method of Determining Retardation Values (Re, Rth):

The retardation values were determined by using an automatic birefringence analyzer "KOBRA-21ADH" (trade name, manufactured by OjiScientific Instruments) based on a parallel Nicol rotation method by using light of a wavelength of 590 nm at 23° C. Light of a wavelength of 480 nm was also used for wavelength dispersion measurement.

(5) Method of Measuring Average Refractive Index of Film:

The average refractive index of the film was determined by measuring refractive indices by using an Abbe refractometer "DR-M4" (trade name, manufactured by Atago Co., Ltd.) by using light of a wavelength of 589 nm at 23° C.

(6) Method of Measuring Transmittance:

The transmittance was measured by using a UV-vis spectrophotometer "V-560" (trade name, manufactured by JASCO Corporation) by using light of a wavelength of 590 nm at 23° C.

(7) Method of Measuring Photoelastic Coefficient:

The retardation values (23° C./wavelength of 590 nm) of the center part of a sample having a size of 2 cm×10 cm were determined under stress (5 to 15 N) by using a spectroscopic ellipsometer "M-220" (trade name, manufactured by JASCO Corporation) while both ends of the sample were fixed, and the photoelastic coefficient was calculated from a slope of a function of the stress and the retardation values.

(8) Method of Determining Contrast Ratio of Liquid Crystal Display Apparatus:

Measurement was performed in a dark room at 23° C. after backlight was turned on for a predetermined period of time by using the following method, liquid crystal cell, and measurement apparatus. A white image and a black image were displayed on a liquid crystal display apparatus, and Y values of an XYZ display system at an azimuth angle of 45° and polar angle of 60° of a display screen were measured by using "EZ Contrast 160D" (trade name, manufactured by ELDIM SA). A contrast ratio "YW/YB" in an oblique direction was calculated from a Y value (YW) of the white image and a Y value (YB) of the black image. Note that, the azimuth angle of 45° refers to a direction rotated by 45° in a counter clockwise direction with respect to a longer side of the panel at 0°. The polar angle of 60° refers to a direction inclined by 60° with respect to a normal direction of the display screen at 0°.

Liquid crystal cell: liquid crystal cell installed in "KLV-17HR2" (trade name, manufactured by Sony Corporation) or liquid crystal cell installed in 23-inch wide liquid crystal television "FLATRON CRL-23WA" (trade name, manufactured by LG Electronics Inc.)

Panel size: 375 mm×230 mm (9-1) Method of Determining Color Shift of Liquid Crystal Display Apparatus:

Measurement was performed in a dark room at 23° C. after backlight was turned on for a predetermined period of time by using the following method, liquid crystal cell, and measurement apparatus. To be specific, a black image was displayed on the liquid crystal display apparatus, and color tones (a value and b value) were measured in all azimuth directions (0° to 360°) at a polar angle of 60° by using "EZ Contrast 160D" (trade name, manufactured by ELDIM SA). Average values of the a values and the b values in all azimuth directions (0 to 360°) at a polar angle of 60° were respectively represented by an $a_{ave.}$ value and a $b_{ave.}$ value, and an a value and a b value at an azimuth angle of 45° and a polar angle of 60° were respectively represented by an $a_{45°}$ value and a $b_{45°}$ value. The color shift (Δab value) in an oblique direction was calculated from the following expression: $\{(a_{45°}-a_{ave.})^2+(b_{45°}-b_{ave.})^2\}^{1/2}$. Note that, the azimuth angle of 45° refers to a direction rotated by 45° in a counter clockwise direction with respect to a longer side of the panel at 0°. The polar angle of 60° refers to a direction viewed from 60° with respect to a normal direction of the panel at 0°.

Liquid crystal cell: liquid crystal cell installed in "KLV-17HR2" (trade name, manufactured by Sony Corporation)

Panel size: 375 mm×230 mm (9-2) Method of Determining Color Shift (Δu'v' value) in Oblique Direction of Liquid Crystal Display Apparatus:

The color shift was calculated by using the following liquid crystal cell and measurement apparatus. To be specific, a black image was displayed on the liquid crystal display apparatus, and color tones (u' value and v' value) were measured in all azimuth directions (0° to 360°) at a polar angle of 60°. The color shift (Δu'v' value) in an oblique direction was calculated from the following expression: $\{(0.25-u')^2+(0.45-v')^2\}^{1/2}$ Liquid crystal cell: liquid crystal cell installed in 23-inch wide liquid crystal television "FLATRON CRL-23WA" (trade name, manufactured by LG Electronics Inc.)

Panel size: 687 mm×412 mm

Measurement apparatus: "EZ Contrast 160D" (trade name, manufactured by ELDIM SA)

Measurement environment: dark room (23° C.)

(10) Method of Evaluating Display Unevenness of Liquid Crystal Display Apparatus:

A display screen was photographed by using the following liquid crystal cell and measurement apparatus. In Table 6, a symbol "o" refers to a liquid crystal cell providing a difference in brightness of 0.96 or less across an entire panel, a symbol "Δ" refers to a liquid crystal cell providing a difference in brightness of 0.97 or more and 1.12 or less, and a symbol "x" refers to a liquid crystal cell providing a difference in brightness of more than 1.28.

Liquid crystal cell: liquid crystal cell installed in "KLV-17HR2", manufactured by Sony Corporation Panel size: 375 mm×230 mm Measurement apparatus: two-dimensional color distribution measurement apparatus "CA-1500", manufactured by Konica Minolta Holdings, Inc.

Measurement environment: dark room (23° C.)

Production of Polarizer

REFERENCE EXAMPLE 1

A polymer film "9P75R" (trade name, thickness of 75 μm, average degree of polymerization of 2,400, degree of saponification of 99.9 mol %, available from Kuraray Co., Ltd.) containing polyvinyl alcohol as a main component was uniaxially stretched 2.5 times by using a roll stretching machine while the polymer film was colored in a coloring bath maintained at 30° C.±3° C. and containing iodine and potassium iodide. Next, the polymer film was uniaxially stretched to a 6 times length of the original length of the polyvinyl alcohol film in a bath maintained at 60° C.±3° C. and containing an aqueous solution of boric acid and potassium iodide while a crosslinking reaction was performed. The obtained film was dried in an air circulating thermostatic oven at 50° C.±1° C. for 30 min, to thereby obtain polarizers P1 and P2 each having a moisture content of 26%, a thickness of 28 μm, a degree of polarization of 99.9%, and a single axis transmittance of 43.5%.

Production of First Optical Element

REFERENCE EXAMPLE 2

A polymer film "UZ-TAC" (trade name, thickness of 40 μm, average refractive index of 1.48, available from Fuji Photo Film Co., Ltd.) containing triacetyl cellulose as a main component was used as it is as a retardation film 1-A. Table 1 collectively shows properties of the retardation film 1-A and properties of a film of Reference Example 3 described below.

TABLE 1

|  | Reference Example 2 | Reference Example 3 |
| --- | --- | --- |
| Retardation film | 1-A | 1-B |
| Thickness(μm) | 40 | 80 |
| Transmittance (%) | 91 | 91 |
| Re[590](nm) | 0.3 | 0.8 |
| Rth[590](nm) | 40.1 | 60.5 |
| C[590] × $10^{-12}(m^2/N)$ | 17.8 | 17.5 |

REFERENCE EXAMPLE 3

A polymer film "UZ-TAC" (trade name, thickness of 80 μm, average refractive index of 1.48, available from Fuji Photo Film Co., Ltd.) containing triacetyl cellulose as a main component was used as it is as a retardation film 1-B. Table 1 shows the properties of the retardation film 1-B.

Production of Second Optical Element

REFERENCE EXAMPLE 4

A biaxially stretched polypropylene film "TORAYFAN E60, high shrinkage-type BO2874" (trade name, thickness of 60 μm, available from Toray Industries, Inc.) was attached to each side of a polymer film "ZEONOR ZF14-100" (trade name, thickness of 100 μm, average refractive index of 1.51, Re[590] of 2.0 nm, Rth[590] of 8.0 nm, available from Zeon Corporation) containing as a main component a cycloolefin-based resin obtained through hydrogenation of a ring-opened polymer of a norbornene-based monomer through an acrylic pressure sensitive adhesive layer (thickness of 15 μm). Then, the resultant was stretched 1.35 times in an air-circulating thermostatic oven at 149° C.±1° C. (temperature measured at a distance of 3 cm from a back surface of the film) by using a roll stretching machine while a longitudinal direction of the film was held, to thereby produce a retardation film 2-A. Table 2 collectively shows the properties of the obtained retardation film 2-A and the properties of retardation films of Reference Examples 5 to 8.

TABLE 2

|  | Reference Example 4 | Reference Example 5 | Reference Example 6 | Reference Example 7 | Reference Example 8 |
|---|---|---|---|---|---|
| Retardation film | 2-A | 2-B | 2-C | 2-D | 2-E |
| Thickness (μm) | 115 | 125 | 116 | 111 | 60 |
| Transmittance (%) | 90 | 90 | 90 | 90 | 90 |
| Re[590](nm) | 200.8 | 142.0 | 181.3 | 245.1 | 130.2 |
| Rth[590] (nm) | 74.3 | 38.3 | 59.1 | 107.8 | 39.1 |
| Re[480]/Re[590] | 1.0 | 1.0 | 1.0 | 1.0 | 1.1 |
| Nz coefficient | 0.37 | 0.27 | 0.33 | 0.44 | 0.30 |
| C[590] × $10^{-12}$ (m²/N) | 3.1 | 3.1 | 3.1 | 3.1 | 50.0 |

Table 3 shows the properties of the biaxially stretched polypropylene film (shrinkable film A) used in Reference Example 4. The acrylic pressure sensitive adhesive used in Reference Example 4 was prepared by: using as a base polymer isononyl acrylate (weight average molecular weight of 550,000) synthesized through solution polymerization; and mixing 3 parts by weight of a crosslinking agent "CORONATE L" (trade name, available from Nippon Polyurethane Industry Co., Ltd.) of a polyisocyanate compound and 10 parts by weight of a catalyst "OL-1" (trade name, available from Tokyo Fine Chemical Co., Ltd.) with respect to 100 parts by weight of the base polymer.

TABLE 3

|  | Shrinkable film | |
|---|---|---|
|  | A | B |
| Shrinkage ratio at 140° C. (longitudinal direction) (%) | 6.4 | 5.7 |
| Shrinkage ratio at 140° C. (width direction) (%) | 12.8 | 7.6 |
| Difference in shrinkage at 140° C. (width direction - longitudinal direction) (%) | 6.4 | 1.9 |

TABLE 3-continued

|  | Shrinkable film | |
|---|---|---|
|  | A | B |
| Shrinkage ratio at 160° C. (longitudinal direction) (%) | 19.6 | 18.0 |
| Shrinkage ratio at 160° C. (width direction) (%) | 45.5 | 35.7 |
| Difference in shrinkage ratio at 160° C. (width direction - longitudinal direction) (%) | 25.9 | 17.7 |
| Shrinkage stress at 140° C. per width of 2 mm (N/2 mm) | 0.65 | 0.45 |
| Shrinkage stress at 140° C. per unit area (N/mm²) | 10.8 | 7.5 |
| Shrinkage stress at 150° C. per width of 2 mm (N/2 mm) | 0.75 | 0.56 |
| Shrinkage stress at 150° C. per unit area (N/mm²) | 12.5 | 9.3 |

REFERENCE EXAMPLE 5

A retardation film 2-B was produced in the same manner as in Reference Example 4 except that the stretching temperature was changed from 149° C. to 155° C., and the stretch ratio was changed from 1.35 times to 1.30 times. Table 2 shows the properties of the obtained retardation film 2-B.

REFERENCE EXAMPLE 6

A retardation film 2-C was produced in the same manner as in Reference Example 4 except that the stretching temperature was changed from 149° C. to 150° C., and the stretch ratio was changed from 1.35 times to 1.30 times. Table 2 shows the properties of the obtained retardation film 2-C.

REFERENCE EXAMPLE 7

A retardation film 2-D was produced in the same manner as in Reference Example 4 except that the stretching temperature was changed from 149° C. to 148° C., and the stretch ratio was changed from 1.35 times to 1.40 times. Table 2 shows the properties of the obtained retardation film 2-D.

REFERENCE EXAMPLE 8

A biaxially stretched polypropylene film "TORAYFAN E60, low shrinkage-type" (trade name, thickness of 60 μm, available from Toray Industries, Inc.) was attached to each side of a polymer film "ELMECH PF film" (trade name, thickness of 55 μm, average refractive index of 1.55, Re[590] of 5.0 nm, Rth[590] of 12.0 nm, available from Kaneka Corporation) containing a polycarbonate-based resin (weight average molecular weight of 60,000) and a styrene-based resin (weight average molecular weight of 1,300) through an acrylic pressure sensitive adhesive layer (thickness of 15 μm). Table 3 shows the properties of the biaxially stretched polypropylene film (shrinkable film B) used in Reference Example 8. Then, the resultant was stretched 1.09 times in an air-circulating thermostatic oven at 146° C.±1° C. (temperature measured at a distance of 3 cm from a back surface of the film) by using a roll stretching machine while a longitudinal direction of the film was held, to thereby produce a retardation film 2-E. Table 2 shows the properties of the obtained retardation film 2-E.

Production of Third Optical Element

REFERENCE EXAMPLE 9

A polymer film "ZEONOR ZF14-100" (trade name, thickness of 100 μm, average refractive index of 1.51, available from Zeon Corporation) containing as a main component a cycloolefin-based resin obtained through hydrogenation of a ring-opened polymer of a norbornene-based monomer was used as it is as an optical film 3-A. Table 4 collectively shows the properties of the obtained optical film 3-A and the properties of optical films of Reference Examples 10 and 11 described below.

TABLE 4

|  | Reference Example 9 | Reference Example 10 | Reference Example 11 |
|---|---|---|---|
| Polymer film | 3-A | 3-B | 3-C |
| Thickness(μm) | 100 | 40 | 85 |
| Transmittance (%) | 90 | 91 | 90 |
| Re[590](nm) | 5.0 | 0.1 | 0.2 |
| Rth[590](nm) | 10.0 | 1.0 | 3.0 |
| C[590] × $10^{-12}(m^2/N)$ | 3.1 | 4.8 | 18.0 |

REFERENCE EXAMPLE 10

65 parts by weight of a copolymer of isobutene and N-methyl maleimide (N-methyl maleimide content of 50 mol % and glass transition temperature of 157° C.), 35 parts by weight of an acrylonitrile/styrene copolymer (AS resin) (acrylonitrile content of 27 mol %), and 1 part by weight of 2-(4,6-diphenyl-1,3,5-triazin-2-yl)-5-[(hexyl)oxy]-phenol (UV absorber) were formed into pellets by using an extruder. Then, the pellets were dried at 100° C. for 5 hours and extruded at 270° C. by using a single-screw extruder of 40 nmϕ and a T-die of 400 mm width, and a sheet-like molten resin was cooled by using a cooling drum, to thereby produce a polymer film (average refractive index of 1.51) having a width of about 600 mm and a thickness of 40 μm as an optical film 3-B. Table 4 shows the properties of the obtained optical film 3-B.

REFERENCE EXAMPLE 11

20 parts by weight of a cycloolefin-based resin "ARTON" (trade name, available from JSR Corporation) obtained through hydrogenation of a ring-opened polymer of a norbornene-based monomer in form of pellets was added to 80 parts by weight of cyclopentanone, to thereby prepare a solution. The solution was applied onto a polymer film "UZ-TAC" (trade name, thickness of 80 μm, average refractive index of 1.48, Re[590] of 0.8 nm, Rth[590] of 60.5 nm, available from Fuji Photo Film Co., Ltd.) containing triacetyl cellulose as a main component to a thickness of 150 μm, and the resulting polymer film was swelled and then dried at 140° C. for 3 min. After drying, the cycloolefin-based resin film formed on the surface of the polymer film was peeled off, to thereby obtain a transparent polymer film containing triacetyl cellulose as a main component as an optical film 3-C. Table 4 shows the properties of the obtained optical film 3-C.

Production of Liquid Crystal Cell of IPS Mode

REFERENCE EXAMPLE 12

A liquid crystal panel was taken out of a commercially available liquid crystal display apparatus "KLV-17HR2" (manufactured by Sony Corporation) including a liquid crystal cell of IPS mode. Polarizing plates arranged above and below the liquid crystal cell were removed, and glass surfaces (front and back surfaces) of the liquid crystal cell were washed.

Production of Liquid Crystal Panel and Liquid Crystal Display Apparatus

EXAMPLE 1

The retardation film 2-A obtained in Reference Example 4 as a second optical element was laminated on a surface of a viewer side of the liquid crystal cell obtained in Reference Example 12 through an acrylic pressure sensitive adhesive layer (thickness of 20 μm) such that a shorter side of the liquid crystal cell and a slow axis of the retardation film 2-A were parallel to each other. Then, the retardation film 1-A obtained in Reference Example 2 as a first optical element was laminated on the surface of the retardation film 2-A through an acrylic pressure sensitive adhesive layer (thickness of 20 μm) such that the slow axis of the retardation film 2-A and a slow axis of the retardation film 1-A were perpendicular to each other. Next, the polarizer P1 obtained in Reference Example 1 was laminated on the surface of the retardation film 1-A through an adhesive layer "GOHSEFIMER Z200" (trade name, thickness of 1 μm, available from Nippon Synthetic Chemical Industry Co., Ltd.) containing as a main component modified polyvinyl alcohol having an acetoacetyl group such that a longer side of the liquid crystal cell and an absorption axis of the polarizer P1 were parallel to each other (at this time, the slow axis of the retardation film 2-A and the absorption axis of the polarizer P1 were perpendicular (90°±0.5°) to each other).

Then, the optical element 3-A obtained in Reference Example 9 as a third optical element was laminated on a backlight side of the liquid crystal cell through an acrylic pressure sensitive adhesive layer (thickness of 20 μm) such that the shorter side of the liquid crystal cell and a slow axis of the optical film 3-A were parallel to each other. Then, the polarizer P2 obtained in Reference Example 1 was laminated on the surface of the optical film 3-A through an acrylic pressure sensitive adhesive layer (thickness of 20 μm) such that the shorter side of the liquid crystal cell and an absorption axis of the polarizer P2 were parallel to each other (at this time, the absorption axis of the polarizer P1 and the absorption axis of the polarizer P2 were perpendicular (90°±0.5°) to each other). Note that, a commercially available polymer film "UZ-TAC" (trade name, thickness of 80 μm, available from Fuji Photo Film Co., Ltd.) containing a cellulose ester as a main component was laminated on outer sides (far sides from the liquid crystal cell) of the polarizers P1 and P2 through an adhesive layer "GOHSEFIMER Z200" (trade name, thickness of 1 μm, available from Nippon Synthetic Chemical Industry Co., Ltd.) containing as a main component modified polyvinyl alcohol having an acetoacetyl group.

The thus-obtained liquid crystal panel A was connected to a backlight unit, to thereby produce a liquid crystal display apparatus A. The liquid crystal panel had favorable display uniformity across the entire surface just after backlight was turned on. Then, backlight was turned on for 10 min, to thereby measure a contrast ratio in an oblique direction and a color shift in an oblique direction. Table 5 shows the obtained properties. Table 6 shows the thickness, relationship with the thickness (that is, $\Delta d$) of each of the optical elements, and display uniformity of the liquid crystal display apparatus.

EXAMPLE 3

A liquid crystal panel C and a liquid crystal display apparatus C were produced in the same manner as in Example 1 except that the retardation film 1-B obtained in Reference Example 3 was used as the first optical element, the retardation film 2-C obtained in Reference Example 6 was used as the second optical element, and the retardation

TABLE 5

| | First optical element | | | Second optical element | | | | Third optical element | | | Liquid crystal display apparatus | | |
|---|---|---|---|---|---|---|---|---|---|---|---|---|---|
| | Retardation film | Re [590] (nm) | Rth [590] (nm) | Retardation film | Re [590] (nm) | Rth [590] (nm) | Nz coefficient | Retardation film | Re [590] (nm) | Rth [590] (nm) | Liquid Crystal Panel | Contrast ratio in oblique direction (YW/YB) | Color shift in oblique direction ($\Delta ab$) |
| Example 1 | 1-A | 0.3 | 40.1 | 2-A | 200.8 | 74.3 | 0.37 | 3-A | 5.0 | 10.0 | A | 70.7 | 0.27 |
| Example 2 | 1-A | 0.3 | 40.1 | 2-A | 200.8 | 74.3 | 0.37 | 3-C | 0.2 | 3.0 | B | 73.5 | 0.22 |
| Example 3 | 1-B | 0.8 | 60.5 | 2-C | 181.3 | 59.1 | 0.33 | 3-C | 0.2 | 3.0 | C | 66.2 | 0.35 |
| Comparative Example 1 | 1-B | 0.8 | 60.5 | 2-E | 130.2 | 39.1 | 0.30 | 1-B | 0.8 | 60.5 | X | 21.4 | 1.25 |
| Comparative Example 2 | — | — | — | — | — | — | — | — | — | — | Y | 5.3 | 1.31 |

TABLE 6

| | First optical element | | Second optical element | | Third optical element | | Liquid crystal display apparatus | | |
|---|---|---|---|---|---|---|---|---|---|
| | Retardation film | Thickness [d1] (μm) | Retardation film | Thickness [d2] (μm) | Retardation film | Thickness [d3] (μm) | Liquid Crystal Panel | $\Delta d = d1 + d2 - d3$ | Display uniformity |
| Example 1 | 1-A | 40 | 2-A | 115 | 3-A | 100 | A | 55 | ○(FIG. 6) |
| Example 2 | 1-A | 40 | 2-A | 115 | 3-C | 85 | B | 70 | Δ(FIG. 7) |
| Example 3 | 1-B | 80 | 2-C | 116 | 3-C | 85 | C | 111 | Δ |
| Comparative Example 1 | 1-B | 80 | 2-E | 60 | 1-B | 80 | X | 60 | X(FIG. 8) |
| Comparative Example 2 | — | — | — | — | — | — | Y | — | Not measured |

Figure 6:
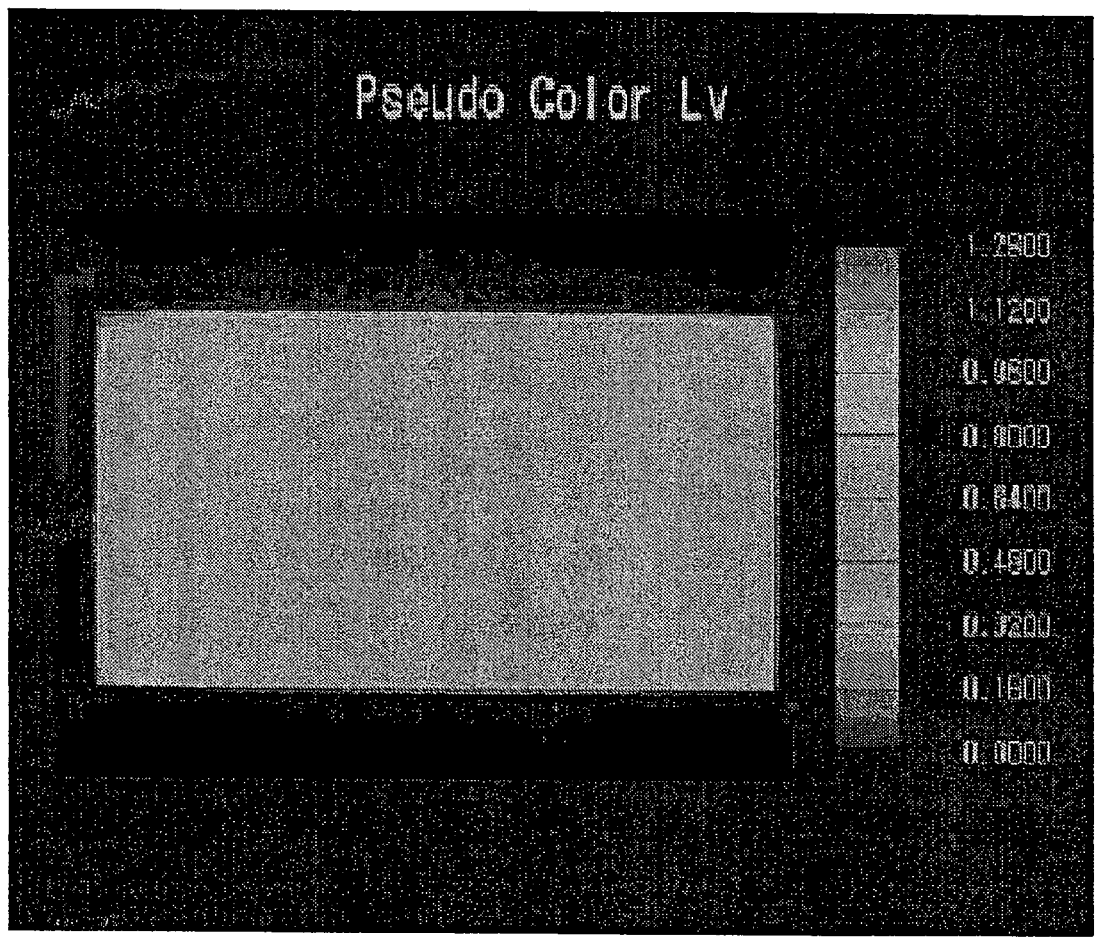
FIG. 6 is a photograph showing results of measurement of display unevenness of a liquid crystal panel according to Example 1 of the present invention.

Backlight was turned on for additional 2 hours, and a display screen of the liquid crystal display apparatus was photographed in a dark room by using a two-dimensional color distribution measurement apparatus "CA-1500" (manufactured by Konica Minolta Holdings, Inc.). As shown in FIG. 6, no display unevenness due to heat of backlight was observed.

EXAMPLE 2

Figure 7:
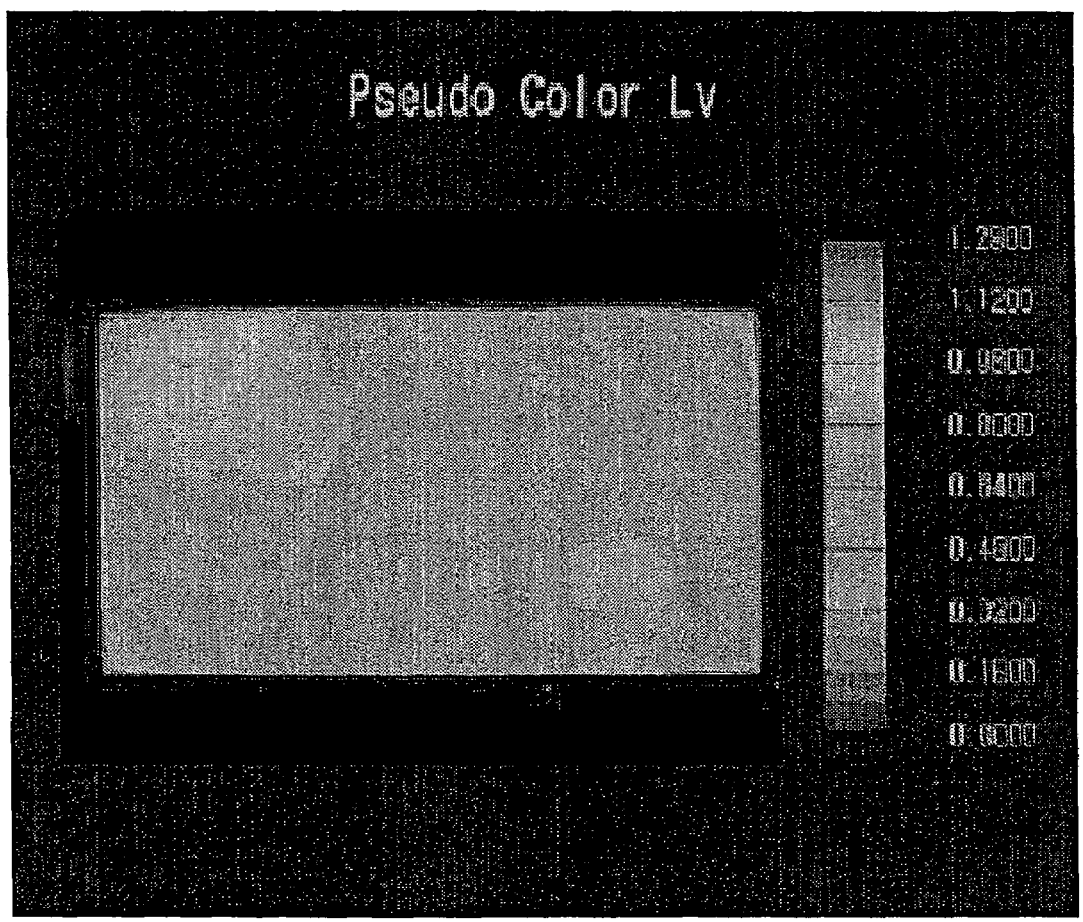
FIG. 7 is a photograph showing results of measurement of display unevenness of a liquid crystal panel according to Example 2 of the present invention.

A liquid crystal panel B and a liquid crystal display apparatus B were produced in the same manner as in Example 1 except that the optical film 3-C obtained in Reference Example 11 was used as the third optical element. The liquid crystal panel had favorable display uniformity across the entire surface just after backlight was turned on. Then, backlight was turned on for 10 min, to thereby measure a contrast ratio in an oblique direction and a color shift in an oblique direction. Tables 5 and 6 show the obtained properties. Backlight was turned on for additional 2 hours, and a display screen of the liquid crystal display apparatus was photographed in a dark room by using a two-dimensional color distribution measurement apparatus "CA-1500" (manufactured by Konica Minolta Holdings, Inc.). As shown in FIG. 7, slight display unevenness due to heat of backlight was observed.

film 3-C obtained in Reference Example 11 was used as the third optical element. The liquid crystal panel had favorable display uniformity across the entire surface just after backlight was turned on. Then, backlight was turned on for 10 min, to thereby measure a contrast ratio in an oblique direction and a color shift in an oblique direction. Tables 5 and 6 show the obtained properties. Backlight was turned on for additional 2 hours, and a display screen of the liquid crystal display apparatus was photographed in a dark room by using a two-dimensional color distribution measurement apparatus "CA-1500" (manufactured by Konica Minolta Holdings, Inc.) As a result, slight display unevenness due to heat of backlight was observed.

COMPARATIVE EXAMPLE 1

Figure 8:
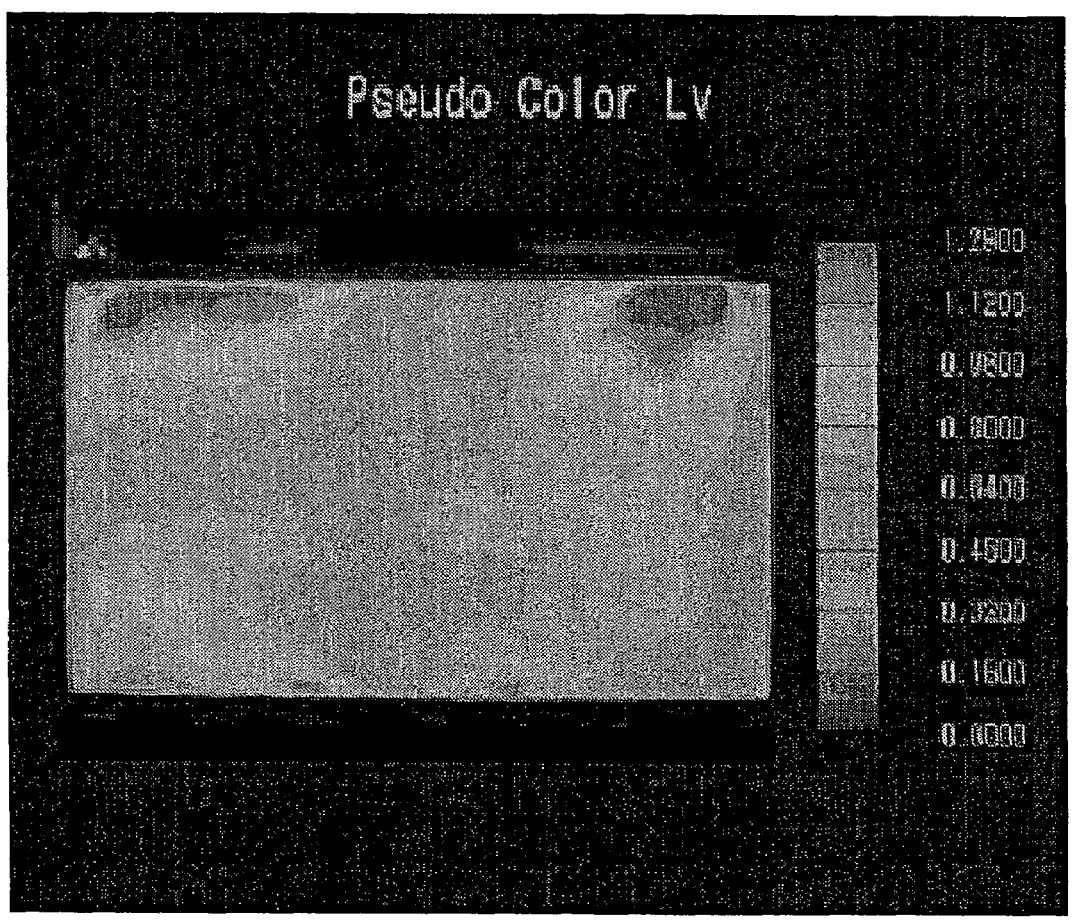
FIG. 8 is a photograph showing results of measurement of display unevenness of a liquid crystal panel according to Comparative Example 1 of the present invention.

A liquid crystal panel X and a liquid crystal display apparatus X were produced in the same manner as in Example 1 except that the retardation film 1-B obtained in Reference Example 3 was used as the first optical element, the retardation film 2-E obtained in Reference Example 8 was used as the second optical element, and the retardation film 1-B obtained in Reference Example 3 was used as the third optical element. The liquid crystal panel had favorable display uniformity across the entire surface just after backlight was turned on. Then, backlight was turned on for 10 min, to thereby measure a contrast ratio in an oblique direction and a color shift in an oblique direction. Tables 5 and 6 show the obtained properties. Backlight was turned on for additional 2 hours, and a display screen of the liquid crystal display apparatus was photographed in a dark room by using a two-dimensional color distribution measurement apparatus "CA-1500" (manufactured by Konica Minolta Holdings, Inc.). As shown in FIG. 8, large display unevenness due to heat of backlight was observed.

COMPARATIVE EXAMPLE 2

The polarizers obtained in Reference Example 1 were laminated on both sides of the liquid crystal cell through an acrylic pressure sensitive adhesive layer such that the respective absorption axes were perpendicular to each other, to thereby produce a liquid crystal panel Y and a liquid crystal display apparatus Y without using the first, second, and third optical elements. The liquid crystal panel had favorable display uniformity across the entire surface just after backlight was turned on. Then, backlight was turned on for 10 min, to thereby measure a contrast ratio in an oblique direction and a color shift in an oblique direction. Tables 5 and 6 show the obtained properties.

EXAMPLE 4

A shrinkable film A "TORAYFAN BO2873" (trade name, available from Toray Industries, Inc.) was attached to each side of a polymer film "ARTON FLZU 130D0" (trade name, thickness of 130 μm, available from JSR Corporation) containing a resin obtained through hydrogenation of a ring-opened polymer of a norbornene-based monomer through an acrylic pressure sensitive adhesive layer (thickness of 15 μm). Then, the resultant was stretched 1.26 times in an air-circulating thermostatic oven at 146° C. by using a roll stretching machine while a longitudinal direction of the film was held, and the shrinkable films A were peeled off, to thereby produce a retardation film 2-F having a thickness of 147 μm. The optical properties of the retardation film 2-F include: Re[590] of 199.0 nm; Rth[590] of 82.0 nm; Nz of 0.41; Re[480]/Re[590] of 1.0; and absolute value of photoelastic coefficient of $5.10 \times 10^{-12}$. Table 3 shows the properties of the shrinkable film A used. The acrylic pressure sensitive adhesive layer used was the same as that of Reference Example 4.

Next, a liquid crystal panel was taken out of a liquid crystal display apparatus "FLATRON CRL-23WA" (trade name, 23-inch wide liquid crystal television, manufactured by LG Electronics Inc.) including a liquid crystal cell of IPS mode. Polarizing plates arranged above and below the liquid crystal cell were removed, and glass surfaces (front and back surfaces) of the liquid crystal cell were washed.

The retardation film 2-F as a second optical element was laminated on the surface of the viewer side of the liquid crystal cell such that an initial alignment direction of the liquid crystal cell and a slow axis of the retardation film 2-F were parallel to each other. Then, the retardation film 1-A as a first optical element was laminated on the surface of the retardation film 2-F such that the initial alignment direction of the liquid crystal cell and the slow axis of the retardation film 1-A were perpendicular to each other. Note that, in a case where the first optical element satisfies nx=ny, a slow axis is not detected in plane, but the slow axis is detected (Re=0.3 nm) because nx≈ny in Example 4. Then, the polarizer P1 as a first polarizer was laminated on the surface of the retardation film 1-A such that the initial alignment direction of the liquid crystal cell and the absorption axis of the polarizer P1 were perpendicular to each other. At this time, the slow axis of the retardation film 2-F and the absorption axis of the polarizer P1 were perpendicular to each other (90°±0.5°). A commercially available triacetyl cellulose film "UZ-TAC" (trade name, thickness of 40 μm, available from Fuji Photo Film Co., Ltd.) was laminated on the surface of the polarizer P1 without the retardation film 1-A laminated.

Next, the optical film 3-B as a third optical element was laminated on the surface of the backlight side of the liquid crystal cell such that the initial alignment direction of the liquid crystal cell and the slow axis of the optical film 3-B were perpendicular to each other. Note that, the third optical element has substantially optical isotropy, but the slow axis is detected (Re=0.1 nm) because nx≈ny in Example 4. Then, the polarizer P2 as a second polarizer was arranged on the surface of the optical film 3-B opposite to the liquid crystal cell such that the initial alignment direction of the liquid crystal cell and the absorption axis of the polarizer P2 were parallel to, each other, to thereby produce a liquid crystal panel D of O-mode having a structure shown in FIG. 2A. A commercially available triacetyl cellulose film "UZ-TAC" (trade name, thickness of 40 μm, available from Fuji Photo Film Co., Ltd.) was laminated on the surface of the polarizer P2 without the optical film 3-B laminated.

Figure 9:
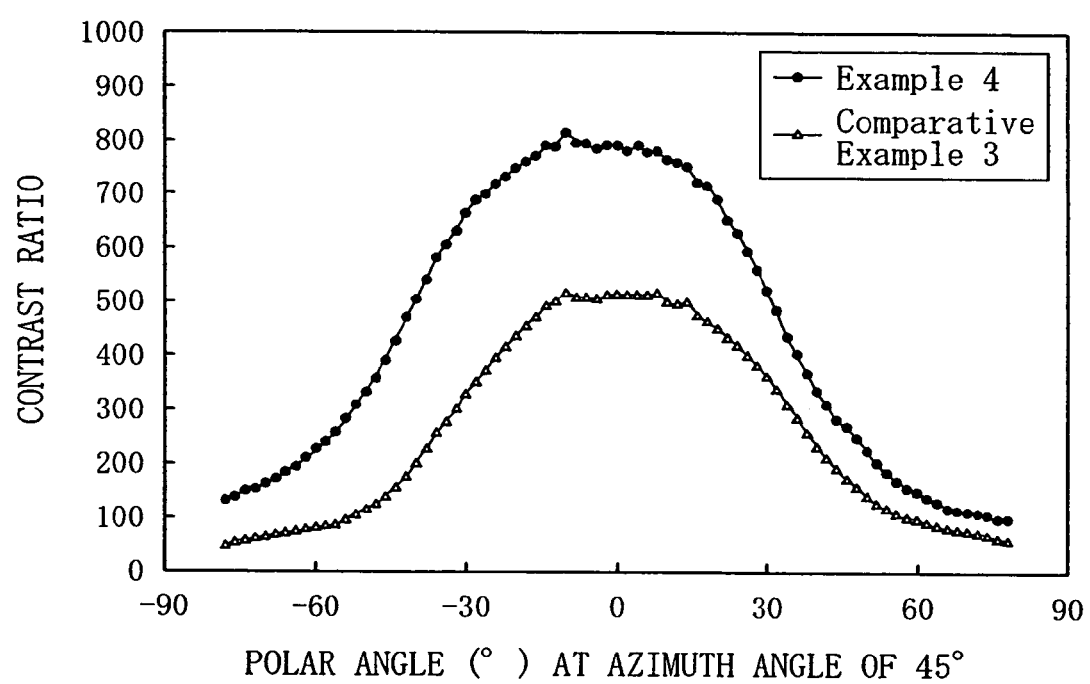
FIG. 9 is a graph showing results of measurement of contrast ratios between the liquid crystal panels of Example 4 and Comparative Example 3.
Figure 10:
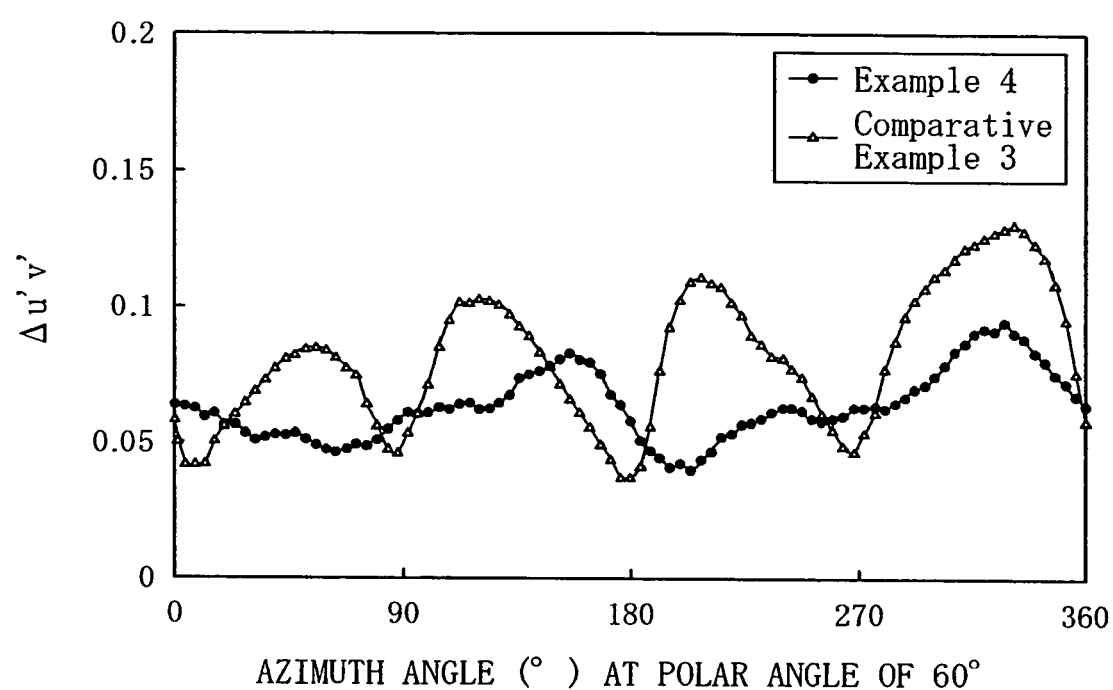
FIG. 10 is a graph showing results of measurement of Δu'v' values between the liquid crystal panels of Example 4 and Comparative Example 3.

The liquid crystal panel D was incorporated into the original liquid crystal display apparatus, and backlight was turned on for 10 min, to thereby measure contrast ratios in all azimuth directions (azimuth angles of 0° to 360°) at a polar angle of 0° (direction of a normal to the panel) to 78°. FIG. 9 shows a contrast ratio of each of Example 4 (liquid crystal panel D) and Comparative Example 3 (liquid crystal panel Z) described below at an azimuth angle of 45° and a polar angle of 0° (direction of a normal to the panel) to 7820. A larger contrast ratio indicates better display properties. The liquid crystal panel D (Example 4) had a maximum contrast ratio of 816, a minimum contrast ratio of 99.9, and an average contrast ratio of 451 at an azimuth angle of 45° and a polar angle of 0° to 78°. Further, a Δu'v' value was measured. FIG. 10 shows the Δu'v' values of Example 4 and Comparative Example 3 described below in all azimuth directions (azimuth angles of 0° to 360°) at a polar angle of 60°. The Δu'v' value is a value calculated from the equation $\Delta u'v' = \{(0.25-u')^2 + (0.45-v')^2\}^{1/2}$, and represents a colored amount from pure black color. The Δu'v' value is an index showing a color shift of the liquid crystal display apparatus, and a smaller Δu'v' value represents better display properties. The liquid crystal panel D of Example 4 had a maximum Δu'v' value of 0.095, a minimum Δu'v' value of 0.040, and an average Δu'v' value of 0.064 in all azimuth directions (azimuth angle of 0° to 360°) at a polar angle of 60°.

COMPARATIVE EXAMPLE 3

The retardation film 2-E as a second optical element was laminated on the surface of the viewer side of the liquid crystal cell obtained in the same manner as in Example 4 such that the initial alignment direction of the liquid crystal cell and the slow axis of the retardation film 2-E were parallel to each other. Then, the retardation film 1-B as a first optical element was laminated on the surface of the retardation film2-E such that the initial alignment direction of the liquid crystal cell and the slow axis of the retardation film 1-B were parallel to each other. Then, the polarizer P1 as a first polarizer was laminated on the surface of the retardation film 1-B such that the initial alignment direction of the liquid crystal cell and the absorption axis of the polarizer P1 were perpendicular to each other. At this time, the slow axis of the retardation film 2-E and the absorption axis of the polarizer P1 were perpendicular to each other (90°±0.5°). A commercially available triacetyl cellulose film "UZ-TAC" (trade name, thickness of 40 μm, available from Fuji Photo Film Co., Ltd.) was laminated on the surface of the polarizer P1 without the retardation film 1-B laminated.

Figure 11:
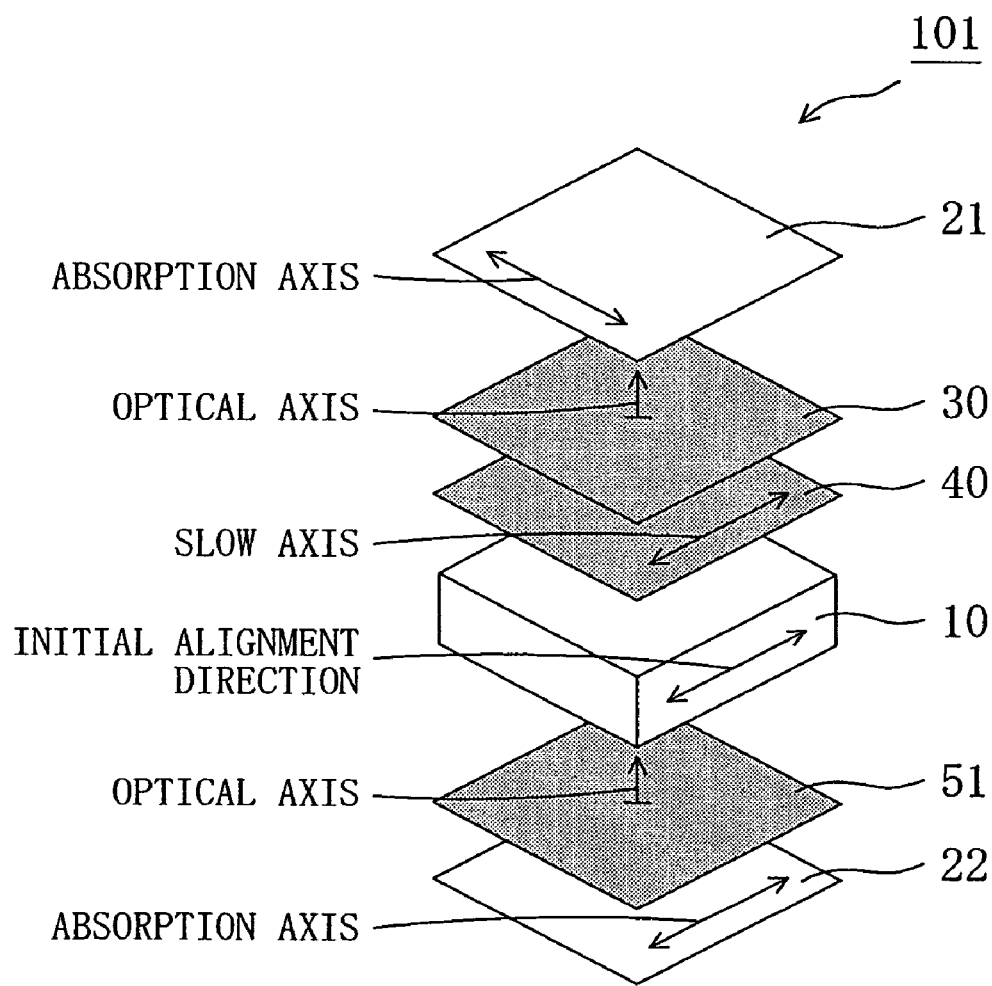
FIG. 11 is a schematic perspective view of a liquid crystal panel used in Comparative Example 3.

Next, the retardation film 1-B (reference numeral 51 in FIG. 11) was laminated on the surface of the backlight side of the liquid crystal cell such that the initial alignment direction of the liquid crystal cell and the slow axis of the retardation film 1-B were perpendicular to each other. Note that, in a case where the retardation film 1-B satisfies nx=ny, a slow axis is not detected in plane, but the slow axis is detected (Re=0.8 nm) because nx≈ny in Comparative Example 3. Then, the polarizer P2 as a second polarizer was arranged on the surface of the retardation film 1-B opposite to the liquid crystal cell such that the initial alignment direction of the liquid crystal cell and the absorption axis of the polarizer P2 were parallel to each other, to thereby produce a liquid crystal panel Z of O-mode having a structure shown in FIG. 11. A commercially available triacetyl cellulose film "UZ-TAC" (trade name, thickness of 40 μm, available from Fuji Photo Film Co., Ltd.) was laminated on the surface of the polarizer P2 without the retardation film 1-B laminated.

The liquid crystal panel Z was incorporated into the original liquid crystal display apparatus, and backlight was turned on for 10 min, to thereby measure contrast ratios and Δu'v' values in all azimuth directions (azimuth angles of 0° to 360°) at a polar angle of 0° (direction of a normal to the panel) to 78°. As shown in FIG. 9, the liquid crystal panel Z had a maximum contrast ratio of 520, a minimum contrast ratio of 51.3, and an average contrast ratio of 266 at an azimuth angle of 45° and a polar angle of 0° to 78°. As shown in FIG. 10, the liquid crystal panel Z had a maximum Δu'v' value of 0.131, a minimum Δu'v' value of 0.038, and an average Δu'v' value of 0.082 in all azimuth directions (azimuth angle of 0° to 360°) at a polar angle of 60°.

[Evaluation]

As shown in Examples 1 to 3, the liquid crystal display apparatus having an improved contrast ratio in an oblique direction and a reduced color shift in an oblique direction was obtained by producing a liquid crystal panel in which: the first optical element having substantially optically negative uniaxial property, and the second optical element having Re[590] of 130 nm to 250 nm and a refractive index profile of nx>nz>ny were arranged on the viewer side of the liquid crystal cell (such that the second optical element was arranged between the first optical element and the liquid crystal cell); and the third optical element having substantially optical isotropy was arranged on the backlight side of the liquid crystal cell. In the liquid crystal display apparatus provided with the liquid crystal panel of Example 1, no display unevenness due to heat of backlight was observed even when backlight was turned on for a long period of time. In the liquid crystal display apparatus of each of Examples 2 and 3, slight display unevenness was observed. In contrast, the liquid crystal display apparatus of each of Comparative Examples 1 and 2 had a small contrast ratio in an oblique direction and a large color shift in an oblique direction. The liquid crystal panel of Comparative Example 1 had poor optical properties and large display unevenness due to heat of backlight.

FIGS. 9 and 10 reveal that the liquid crystal display apparatus of Example 4 had excellent display properties of large contrast ratios in all azimuth directions, a small maximum color shift, and a small average color shift. In contrast, the liquid crystal display apparatus obtained in Comparative Example 3 had display properties of small contrast ratios in all azimuth directions, a large maximum color shift, and a large average color shift.

As described above, the liquid crystal panel of the present invention has an increased contrast ratio in an oblique direction and a reduced color shift in an oblique direction, and thus is very useful for improving display properties of the liquid crystal display apparatus. Therefore, the liquid crystal panel of the present invention may suitably be used for a liquid crystal display apparatus or a liquid crystal television.

Many other modifications will be apparent to and be readily practiced by those skilled in the art without departing from the scope and spirit of the invention. It should therefore be understood that the scope of the appended claims is not intended to be limited by the details of the description but should rather be broadly construed.

What is claimed is:

1. A liquid crystal panel comprising:
    a liquid crystal cell comprising a liquid crystal layer containing homogeneously aligned liquid crystal molecules in the absence of an electric field;
    a first polarizer arranged on one side of the liquid crystal cell;
    a second polarizer arranged on the other side of the liquid crystal cell;
    a first optical element and a second optical element arranged between the first polarizer and the liquid crystal cell; and
    a third optical element arranged between the second polarizer and the liquid crystal cell, wherein:
    the first optical element has substantially optically negative uniaxial property;
    the second optical element has a refractive index profile of nx>nz>ny, satisfies the following expressions (1) and (2), has wavelength dispersion property of 0.8 to 1.2, and is arranged between the first optical element and the liquid crystal cell; and
    the third optical element has substantially optical isotropy:

$$130 \text{ nm} \leq Re[590] \leq 250 \text{ nm} \quad (1)$$

$$0 \text{ nm} < Rth[590] < Re[590] \quad (2)$$

wherein in the expressions (1) and (2), Re[590] and Rth[590] respectively represent in-plane retardation and thickness direction retardation values determined by using light of a wavelength of 590 nm at 23° C.

2. The liquid crystal panel according to claim 1, wherein an initial alignment direction of the liquid crystal cell is substantially parallel to a direction of an absorption axis of the second polarizer.

3. The liquid crystal panel according to claim 2, wherein the initial alignment direction of the liquid crystal cell is substantially parallel to a direction of an absorption axis of the polarizer arranged on a backlight side of the liquid crystal cell.

4. The liquid crystal panel according to claim 2, wherein the initial alignment direction of the liquid crystal cell is substantially perpendicular to a direction of an absorption axis of the polarizer arranged on a backlight side of the liquid crystal cell.

5. The liquid crystal panel according to claim 1, wherein an absolute value of a difference ($\Delta d = d1+d2-d3$) between a sum (d1+d2) of a thickness (d1) of the first optical element and a thickness (d2) of the second optical element, and a thickness (d3) of the third optical element is 120 μm or less.

6. The liquid crystal panel according to claim 1, wherein the first optical element has Rth[590] of 10 nm to 100 nm.

7. The liquid crystal panel according to claim 1, wherein the first optical element comprises a polymer film containing a cellulose ester as a main component.

8. The liquid crystal panel according to claim 1, wherein a slow axis of the second optical element is substantially parallel or perpendicular to an absorption axis of the first polarizer.

9. The liquid crystal panel according to claim 1, wherein the second optical element comprises a stretched film of a polymer film containing a norbornene-based resin.

10. The liquid crystal panel according to claim 9, wherein the second optical element comprises a stretched film of a polymer film containing a resin obtained through hydrogenition of a ring-opened polymer and/or ring-opened copolymer of a norbornene-based monomer.

11. The liquid crystal panel according to claim 1, wherein the third optical element comprises a polymer film containing as a main component at least one resin selected from the group consisting of a cellulose ester, a cycloolefin-based resin obtained through hydrogenation of a ring-opened polymer of a norbornene-based monomer, an addition copolymer of a norbornene-based monomer and an α-olefin monomer, and an addition copolymer of a maleimide-based monomer and an olefin monomer.

12. A liquid crystal television comprising the liquid crystal panel according to claim 1.

13. A liquid crystal display apparatus comprising the liquid crystal panel according to claim 1.

14. The liquid crystal panel according to claim 1, wherein the third optical element has an absolute value of a thickness direction retardation value (Rth[590]) of 10 nm or less.

* * * * *